United States Patent
Hasegawa

(10) Patent No.: US 9,411,543 B2
(45) Date of Patent: Aug. 9, 2016

(54) IMAGE PROCESSING APPARATUS

(71) Applicant: Brother Kogyo Kabushiki Kaisha, Nagoya-shi, Aichi-ken (JP)

(72) Inventor: Tomohiko Hasegawa, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 18 days.

(21) Appl. No.: 14/466,229

(22) Filed: Aug. 22, 2014

(65) Prior Publication Data

US 2015/0055152 A1    Feb. 26, 2015

(30) Foreign Application Priority Data

Aug. 23, 2013 (JP) ................. 2013-173281

(51) Int. Cl.
| | |
|---|---|
| G06F 13/00 | (2006.01) |
| G06F 3/12 | (2006.01) |
| H04N 1/387 | (2006.01) |
| H04N 1/60 | (2006.01) |
| G06T 11/00 | (2006.01) |

(52) U.S. Cl.
CPC ............... *G06F 3/12* (2013.01); *G06T 11/001* (2013.01); *H04N 1/3871* (2013.01); *H04N 1/60* (2013.01)

(58) Field of Classification Search
None
See application file for complete search history.

(56) References Cited

U.S. PATENT DOCUMENTS

| | | | |
|---|---|---|---|
| 7,184,589 B2 * | 2/2007 | Okubo | 382/166 |
| 2012/0134581 A1 * | 5/2012 | Matsuda | 382/164 |

FOREIGN PATENT DOCUMENTS

JP    2008-252786 A    10/2008

* cited by examiner

*Primary Examiner* — Neil R McLean
(74) *Attorney, Agent, or Firm* — Banner & Witcoff, Ltd.

(57) ABSTRACT

An image processing apparatus comprising: a processor; and memory storing instructions causing the image processing apparatus to execute: acquiring target data representing a target image; performing determination for each of a plurality of target pixels forming the target data about whether or not the target pixel is an object pixel which has density equal to or higher than predetermined density; selecting first color as a conversion color for a first object pixel of object pixels, and selecting a second color as a conversion color for the second object pixel of object pixels; converting a pixel value of the first object pixel to a first value indicative of the first color, and converting a pixel value of the second object pixel to a second value indicative of the second color to generate first converted data; and outputting the first converted data.

15 Claims, 18 Drawing Sheets

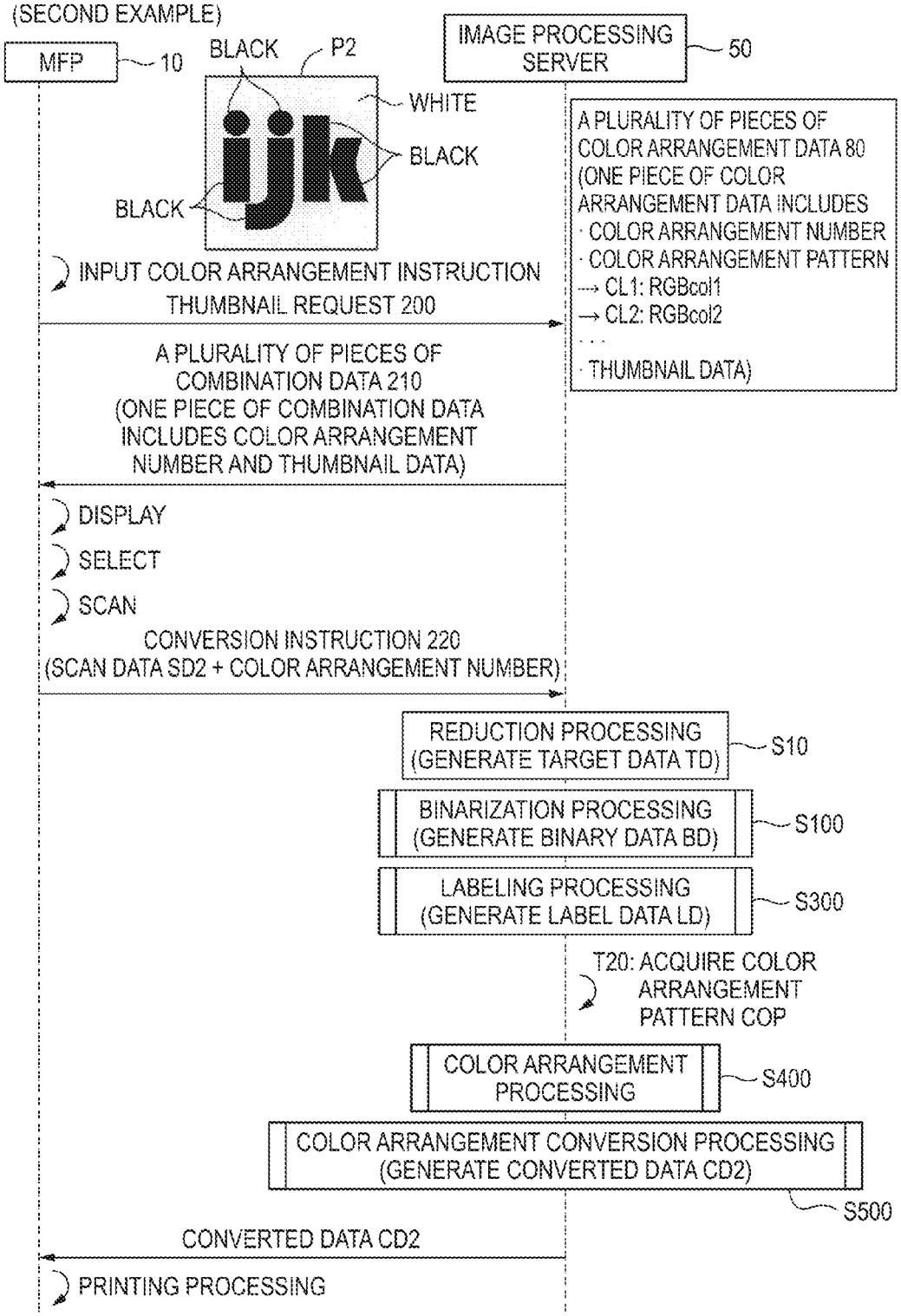

(SECOND EXAMPLE)

| Ltar | j | CN1 | CN2 | CN3 | CN4 | CN5 |
|---|---|---|---|---|---|---|
| – | – | 0 | 0 | 0 | 0 | 0 |
| 1 | 1 | 100 | 0 | 0 | 0 | 0 |
| 2 | 2 | 100 | 200 | 0 | 0 | 0 |
| 3 | 3 | 100 | 200 | 150 | 0 | 0 |
| 4→5 | 4 | 100 | 200 | 150 | 50 | 0 |
| 6 | 5 | 100 | 200 | 150 | 50 | 150 |
| 7 | 1 | 150 | 200 | 150 | 50 | 150 |
| 8 | 2→3 | 150 | 200 | 225 | 50 | 150 |
| 9 | 4 | 150 | 200 | 225 | 150 | 150 |

(THIRD EXAMPLE)

| Ltar | j | CN1 | CN2 | CN3 | CN4 | CN5 |
|---|---|---|---|---|---|---|
| – | – | 0 | 0 | 0 | 0 | 0 |
| 1 | 1 | 100 | 0 | 0 | 0 | 0 |
| 2 | 2 | 100 | 200 | 0 | 0 | 0 |
| 3 | 3 | 100 | 200 | 150 | 0 | 0 |
| 4→5 | 4 | 100 | 200 | 150 | 50 | 0 |
| 6 | 5 | 100 | 200 | 150 | 50 | 150 |
| 7 | 4 | 100 | 200 | 150 | 100 | 150 |
| 8 | 1 | 175 | 200 | 150 | 100 | 150 |
| 9 | 4 | 175 | 200 | 150 | 200 | 150 |

(THIRD EXAMPLE)

(FOURTH EXAMPLE)

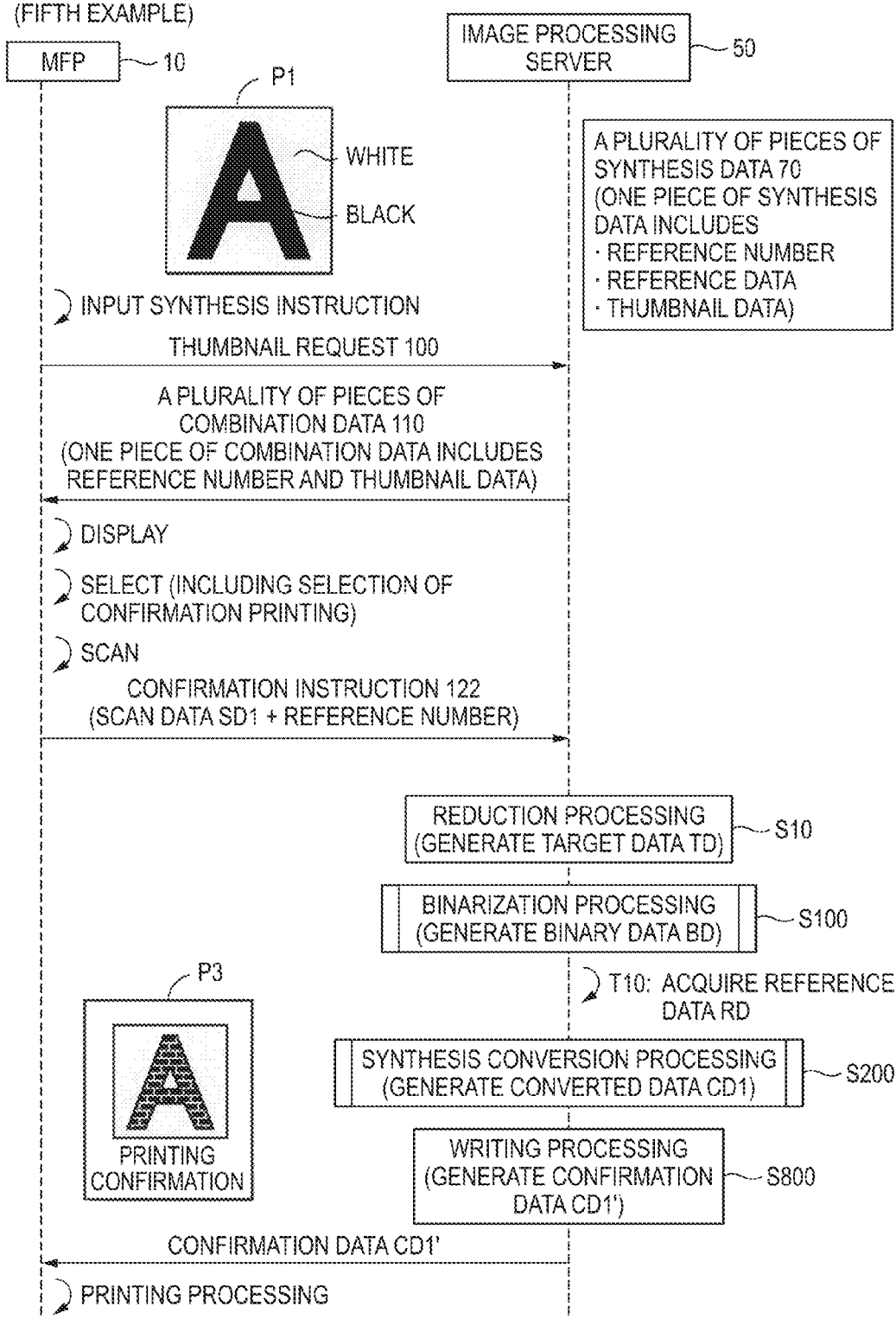

IMAGE PROCESSING APPARATUS

CROSS-REFERENCE TO RELATED APPLICATION

This application is based upon and claims the benefit of priority of Japanese Patent Application No. 2013-173281 filed on Aug. 23, 2013, the contents of which are incorporated herein by reference in its entirety.

BACKGROUND

The present disclosure discloses an image processing apparatus which executes image processing on target data.

An image processing apparatus which superimposes sub information on main image information is known. The image processing apparatus modulates a first color difference lattice pattern by first sub information to superimpose the first color difference lattice pattern on the main image information. Next, the image processing apparatus modulates a second color difference lattice pattern by second sub information to further superimpose the second color difference lattice pattern on the main image information.

SUMMARY

The present disclosure discloses a technique which can execute new image processing on target data to provide a user with an interesting image.

One of aspects of the present disclosure provides the following arrangements:

An image processing apparatus comprising:
a processor; and
memory storing computer readable instructions, when executed by the processor, causing the image processing apparatus to execute:
  acquiring target data representing a target image;
  performing determination for each of a plurality of target pixels forming the target data about whether or not the target pixel is an object pixel which has density equal to or higher than predetermined density;
  for each of two or more object pixels including a first object pixel and a second object pixel different from the first object pixel, selecting first color as a conversion color for the first object pixel, and selecting a second color different from the first color as a conversion color for the second object pixel;
  for each of the two or more object pixels including the first object pixel and the second object pixel, converting a pixel value of the first object pixel to a first value indicative of the first color, and converting a pixel value of the second object pixel to a second value indicative of the second color to generate first converted data; and
  outputting the first converted data.

A non-transitory computer readable recording medium storing a program, when executed by a compute of an image processing apparatus, causing the image processing apparatus to execute:
  acquiring target data representing a target image to be converted;
  performing determination for each of a plurality of target pixels forming the target data about whether or not the target pixel is a object pixel which has density equal to or higher than predetermined density;
  for each of two or more object pixels including a first object pixel and a second object pixel, selecting a first color as a conversion color for the first object pixel, and selecting a second color different from the first color as a conversion color for the second object pixel different from the first object pixel,
  for each of the two or more object pixels, converting the pixel value of the first object pixel to a first value indicative of the first color, and converting the pixel value of the second object pixel to a second value indicative of the second color to generate first converted data; and
  outputting the first converted data.

BRIEF DESCRIPTION OF THE DRAWINGS

FIG. 7 is a sequence diagram of a second example.
FIG. 18 is a sequence diagram of a fifth example.

DESCRIPTION OF ILLUSTRATIVE EMBODIMENTS

First Embodiment

Figure 1:
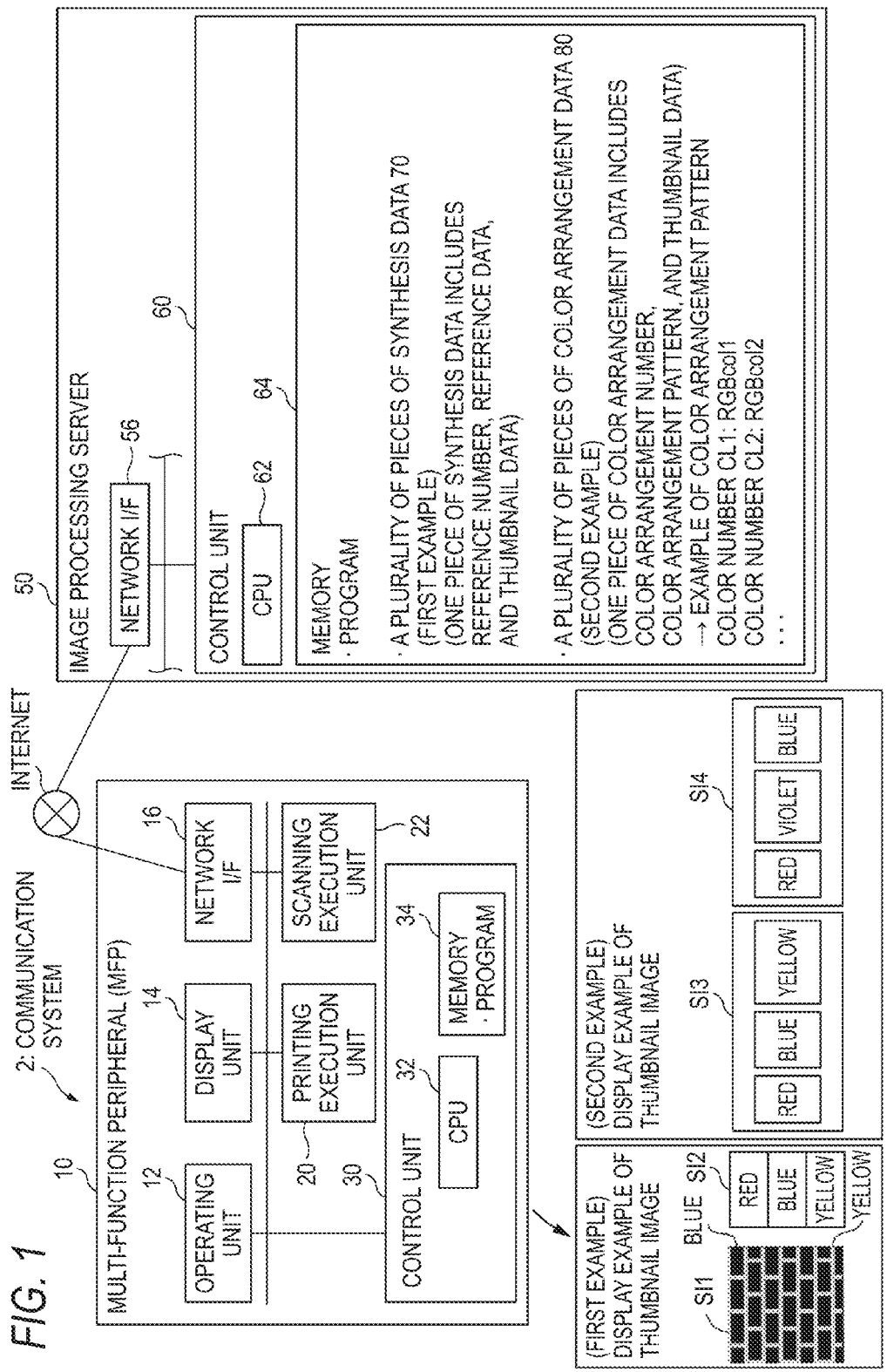
FIG. 1 shows the configuration of a communication system.

As shown in FIG. 1, a communication system 2 includes a multi-function peripheral 10 and an image processing server 50. The multi-function peripheral 10 and the image processing server 50 can perform communication with each other through Internet. Hereinafter, the multi-function peripheral 10 is referred to as "MFP (an abbreviation of Multi-Function Peripheral) 10".

(Configuration of MFP 10)

The MFP 10 is peripheral equipment (that is, peripheral equipment, such as a PC) which can execute multiple functions including a printing function and a scanning function. The MFP 10 includes an operating unit 12, a display unit 14, a network interface 16, a printing execution unit 20, a scanning execution unit 22, and a control unit 30.

The operating unit 12 includes a plurality of keys. A user can operate the operating unit 12 to give various instructions to the MFP 10. The display unit 14 is a display which is provided to display various kinds of information. The network interface 16 is connected to Internet. The printing execution unit 20 is an ink jet type or laser type printing mechanism. The scanning execution unit 22 is a CCD type or CIS type scanning mechanism.

The control unit 30 includes a CPU 32 and a memory 34. The CPU 32 is a processor which executes various kinds of processing according to a program stored in the memory 34. The memory 34 has a RAM, a ROM, or the like.

(Configuration of Image Processing Server 50)

The image processing server 50 is a server which is provided to execute image processing, and is provided on Internet by a vendor of the MFP 10. The image processing server 50 includes a network interface 56 and a control unit 60.

The network interface 56 is connected to Internet. The control unit 60 includes a CPU 62 and a memory 64. The CPU 62 is a processor which executes various kinds of processing according to a program stored in the memory 64. The memory 64 has a RAM, a ROM, or the like.

The memory 64 stores a plurality of pieces of synthesis data 70 in advance. Each of a plurality of pieces of synthesis data 70 is data in which a reference number, reference data, and thumbnail data are associated with one another. The reference number is the number for identifying reference data. Reference data is RGB bitmap data, and is used to convert target data. Reference data has the number of pixels corresponding to postcard size. Reference data is not data in which the pixel values of all pixels are the same (that is, data representing a single color), but data which represents a plurality of regions having a plurality of colors. Thumbnail data is reduced data of reference data.

Figure 2:
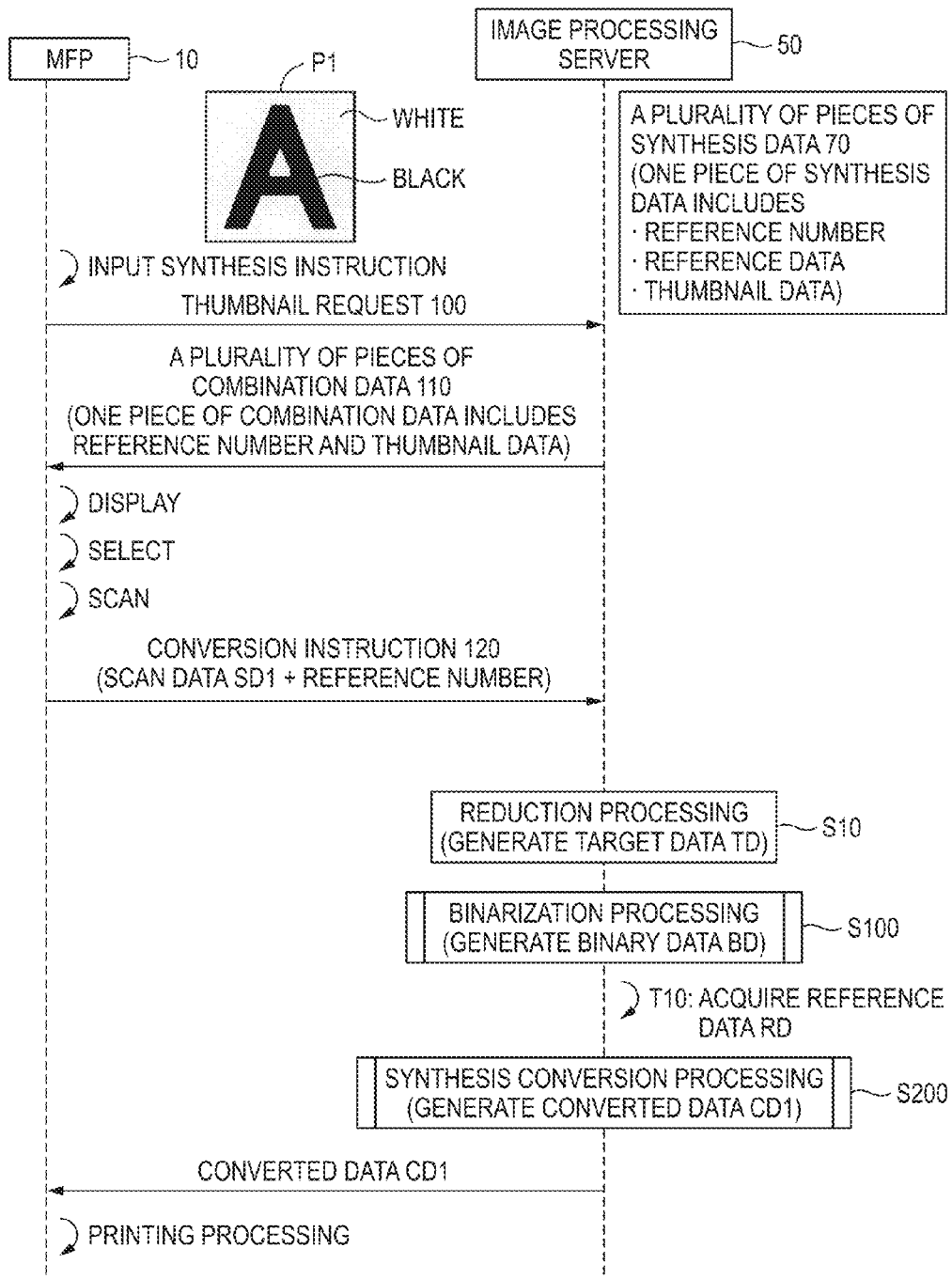
FIG. 2 is a sequence diagram of a first example.

(Processing Which is Executed by MFP 10 and Image Processing Server 50; FIG. 2)

Subsequently, processing which is executed by the MFP 10 and the image processing server 50 will be described referring to FIG. 2. The user of the MFP 10 first draws an object, such as a character or a figure, on a sheet P1 of A4 size in handwriting. In the embodiment of FIG. 2, a black character indicative of the letter "A" is drawn on a white sheet P1. Next, the user operates the operating unit 12 of the MFP 10 to input a synthesis instruction to the MFP 10.

If the synthesis instruction is input by the user, the CPU 32 of the MFP 10 transmits a thumbnail request 100 for requesting the transmission of thumbnail data to the image processing server 50.

If the thumbnail request 100 is received from the MFP 10, for each of a plurality of pieces of synthesis data 70, the CPU 62 of the image processing server 50 generates combination data, in which the reference number and thumbnail data included in synthesis data are associated with each other. As a result, the CPU 62 generates a plurality of pieces of combination data 110 from a plurality of pieces of synthesis data 70. Then, the CPU 62 transmits a plurality of pieces of combination data 110 to the MFP 10.

If a plurality of pieces of combination data 110 are received from the image processing server 50, the CPU 32 of the MFP 10 displays a plurality of thumbnail images, which are represented by a plurality of pieces of thumbnail data included in a plurality of pieces of combination data 110, on the display unit 14.

FIG. 1 shows an example of thumbnail images SI1 and SI2 which are displayed in this embodiment. The thumbnail image SI1 includes a blue region and a yellow region. The thumbnail image SI2 is an image different from the thumbnail image SI1, and includes a red region, a blue region and a yellow region. The user operates the operating unit 12 to select one thumbnail image while viewing the thumbnail images SI1 and SI2 displayed on the display unit 14.

As shown in FIG. 2, if one thumbnail image is selected by the user, the CPU 32 of the MFP 10 supplies an instruction to scan the sheet P1 to the scanning execution unit 22. With this, the scanning execution unit 22 executes color scanning of the sheet P1 of A4 size to generate scan data SD1. Scan data SD1 is RGB bitmap data having the number of pixels corresponding to A4 size.

Next, the CPU 32 of the MFP 10 acquires the reference number which is associated with thumbnail data representing the selected thumbnail image among a plurality of pieces of combination data 110. The CPU 32 transmits a conversion instruction 120 including scan data SD1 and the acquired reference number to the image processing server 50.

When the MFP receives the conversion instruction 120, the CPU 62 of the image processing server 50 executes reduction processing for scan data SD1 included in the conversion instruction 120 in S10. Specifically, the CPU 62 reduces scan data SD1 having the number of pixels corresponding to A4 size to generate target data TD having the number of pixels corresponding to postcard size. For example, when the number of pixels corresponding to A4 size and the number of pixels corresponding to postcard size are respectively "K1" and "K2", the CPU 62 removes (K1−K2) pixels from scan data SD1 having K1 pixels to generate target data TD having K2 pixels.

Next, in S100, the CPU 62 of the image processing server 50 executes binarization processing on target data TD. With this, the CPU 62 generates binary data BD having K2 pixels indicative of "1" or "0" from target data TD.

Next, in T10, the CPU 62 of the image processing server 50 acquires one piece of reference data RD associated with the reference number included in the conversion instruction 120 among a plurality of pieces of reference data included in a plurality of pieces of synthesis data 70. Here, reference data RD to be acquired has the number of pixels (that is, has K2 pixels) corresponding to postcard size.

Next, in S200, the CPU 62 of the image processing server 50 executes synthesis conversion processing on target data TD using binary data BD and reference data RD. With this, the CPU 62 generates converted data CD1 having K2 pixels. Then, the CPU 62 transmits converted data CD1 to the MFP 10.

If converted data CD1 is received from the MFP 10, the CPU 32 of the MFP 10 supplies converted data CD1 to the printing execution unit 20. As a result, the printing execution unit 20 prints an image represented by converted data CD1 on a sheet of postcard size. With this, the printed sheet can be provided to the user.

Figure 3:
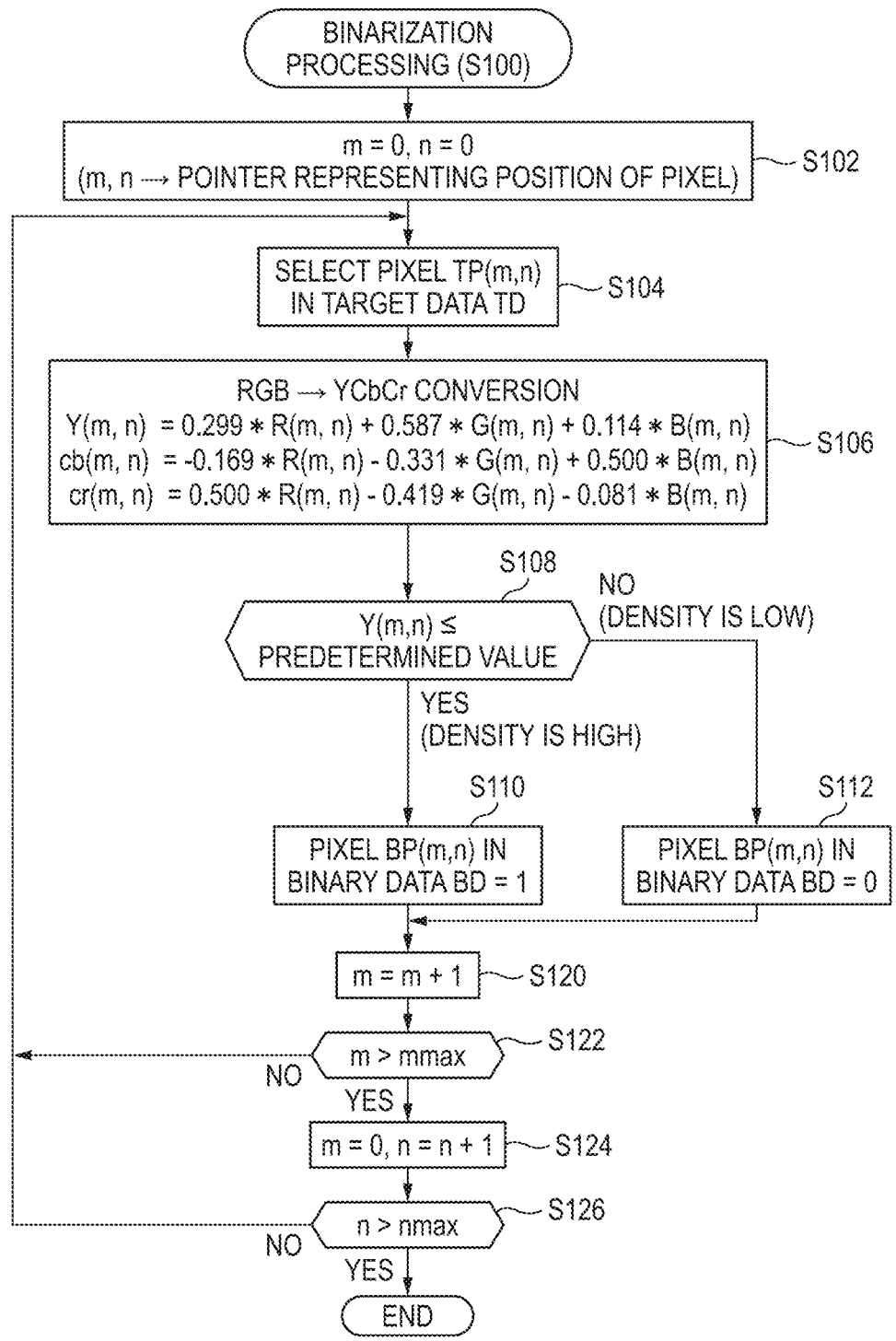
FIG. 3 is a flowchart of binarization processing.

(Binarization Processing; FIG. 3)

Subsequently, the details of the binarization processing of S100 of FIG. 2 will be described referring to FIG. 3. In S102, the CPU 62 of the image processing server 50 sets the value of each of pointers m and n indicative of the position of the pixel to "0".

Figure 4:
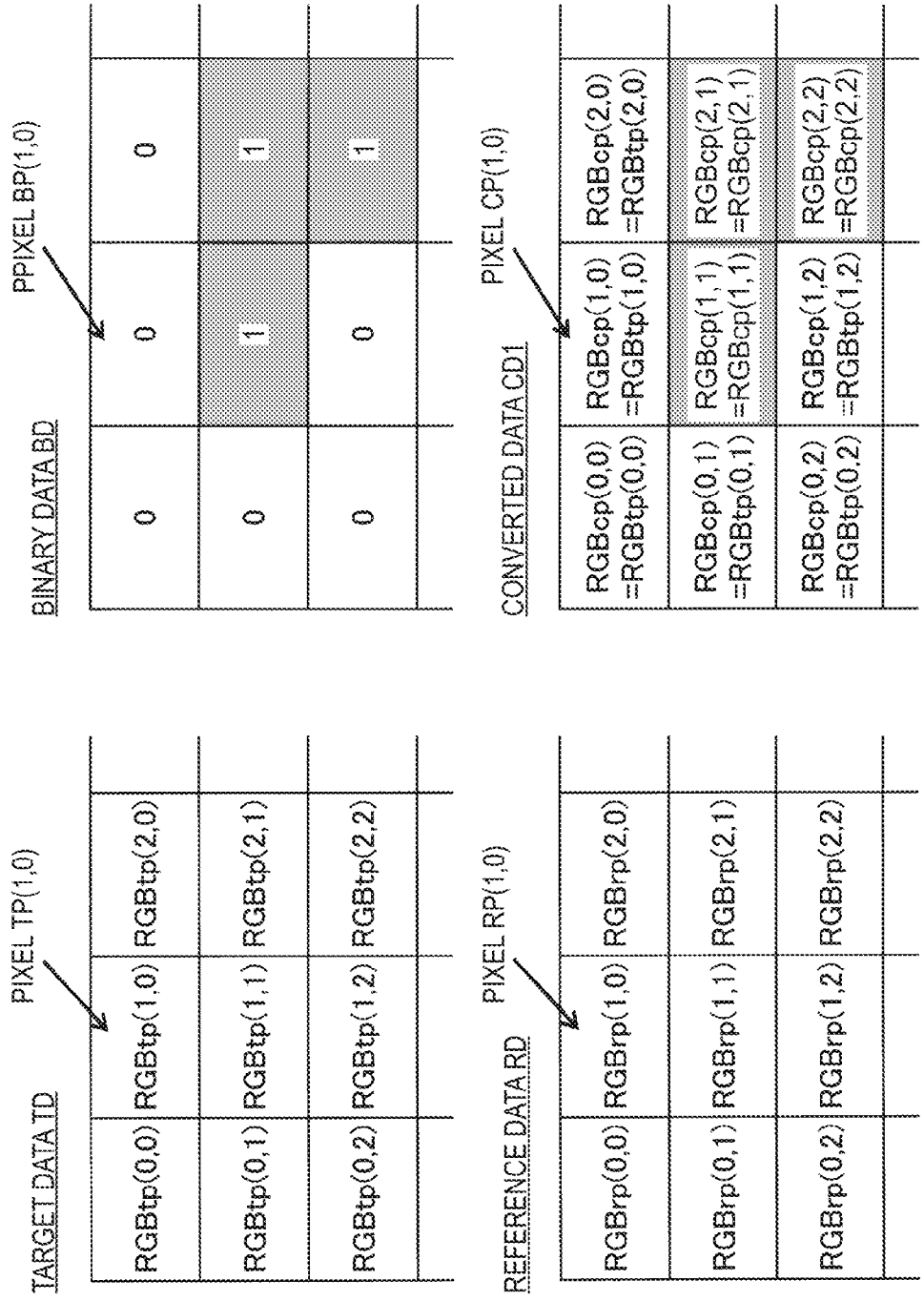
FIG. 4 shows target data, binary data, reference data, and converted data.

FIG. 4 schematically shows a part of each of target data TD, binary data BD, reference data RD, and converted data CD1. The value of the pointer m indicates the position of each pixel in each piece of data TD or the like in a first direction (in this example, a right-left direction of FIG. 4). The value of the pointer m increases from a first side toward a second side in the first direction (in this example, from the left side toward the right side of FIG. 4). The value of the pointer n indicates the position of each pixel in each piece of data TD or the like in a second direction (in this example, an up-down direction of FIG. 4). The value of the pointer n increases from a first side toward a second side in the second direction (in this example, from the upper side toward the lower side of FIG. 4).

In S104 of FIG. 3, the CPU 62 selects one pixel TP(m,n) in target data TD. Next, in S106, the CPU 62 executes YCC conversion for the pixel value RGBtp(m,n) of the pixel TP(m, n). Specifically, the CPU 62 calculates a luminance value Y(m,n), a first color difference value Cb(m,n), and a second color difference value Cr(m,n) according to numerical expressions in S106. In the numerical expression in S106, R(m,n), G(m,n), and B(m,n) are respectively the R value, the G value, and the B value of RGBtp(m,n).

In S108, the CPU 62 performs determination about whether or not the luminance value Y(m,n) is equal to or less than a predetermined value determined in advance. When the luminance value Y(m,n) is equal to or less than the predetermined value (YES in S108), this means that the density of the pixel TP(m,n) is comparatively high (that is, is equal to or higher than predetermined density). When the luminance value Y(m,n) is greater than the predetermined value (NO in S108), this means that the density of the pixel TP(m,n) is comparatively low (that is, is lower than predetermined density). That is, in S108, the CPU 62 performs determination about whether or not the density of the pixel TP(m,n) is equal to or higher than predetermined density. Hereinafter, a pixel (that is, in S108, a pixel which is determined to be YES) in target data TD which is determined to be equal to or lower than predetermined density is referred to as "object pixel".

When it is determined that the luminance value Y(m,n) is equal to or less than the predetermined value (that is, YES in S108), in S110, the CPU 62 stores "1" as the pixel value of a pixel BP(m,n) in binary data BD. When it is determined that the luminance value Y(m,n) is greater than the predetermined value (NO in S108), in S112, the CPU 62 stores "0" as the pixel value of the pixel BP(m,n) in binary data BD.

If S110 or S112 ends, in S120, the CPU 62 adds "1" to the current value of the pointer m to set a new value of the pointer m. Next, in S122, the CPU 62 performs determination about whether or not the value of the pointer m is greater than mmax. mmax is a value which coincides with the number of pixels in the first direction of target data TD (that is, the number of pixels arranged in the right-left direction of FIG. 4).

When it is determined that the value of the pointer m is greater than mmax (YES in S122), in S124, the CPU 62 sets the value of the pointer m to "0" and adds "1" to the current value of the pointer n to set a new value of the pointer n. Next, in S126, the CPU 62 performs determination about whether or not the value of the pointer n is greater than nmax. nmax is a value which coincides with the number of pixels in the second direction of target data TD (that is, the number of pixels arranged in the up-down direction of FIG. 4).

When it is determined that the value of the pointer m is equal to or less than mmax (NO in S122) or when it is determined that the value of the pointer n is equal to or less than nmax (NO in S126), the CPU 62 returns to S104. With this, the CPU 62 selects a new pixel TP(m,n) in target data TD and executes the processing of S106 to S112 again.

When it is determined that the value of the pointer n is greater than nmax (YES in S126), the CPU 62 determines that the processing of S106 to S112 is executed for all pixels in target data TD and ends the binarization processing. With this, binary data BD (see FIG. 4) is completed.

Figure 5:
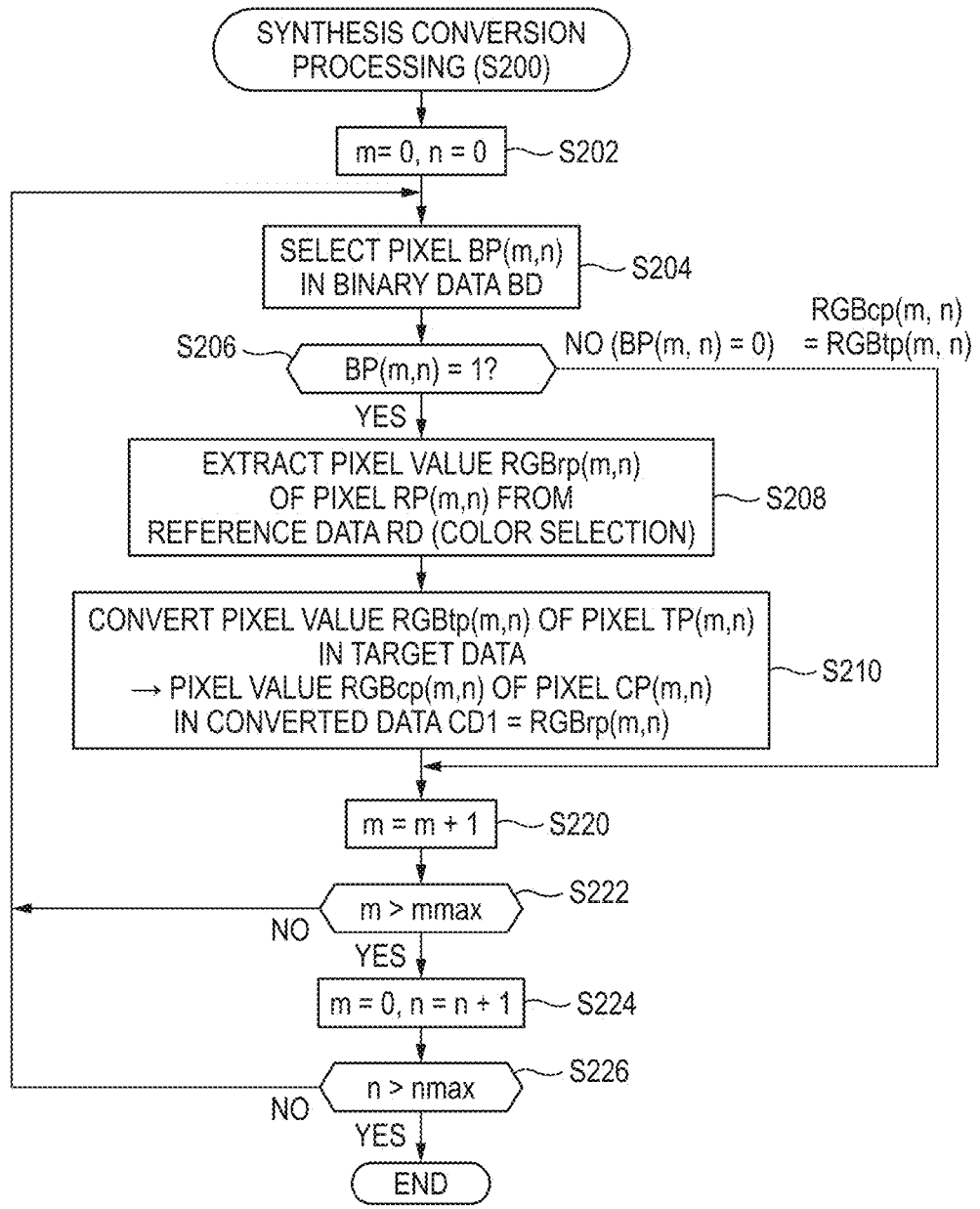
FIG. 5 is a flowchart of synthesis conversion processing.

(Synthesis Conversion Processing; FIG. 5)

Subsequently, the details of the synthesis conversion processing of S200 of FIG. 2 will be described referring to FIG. 5. In S202, the CPU 62 of the image processing server 50 sets the value of each of the pointers m and n indicative of the position of the pixel to "0". In S204, the CPU 62 selects one pixel BP(m,n) in binary data BD. Then, in S206, the CPU 62 performs determination about whether or not the pixel value of the pixel BP(m,n) is "1". That is, the CPU 62 performs determination about whether or not the pixel TP(m,n) in target data TD is a object pixel which has density equal to or higher than predetermined density.

When it is determined that the pixel value of the pixel BP(m,n) is "1" (YES in S206), in S208, the CPU 62 extracts the pixel value RGBrp(m,n) of a pixel RP(m,n) from reference data RD acquired in T10 of FIG. 2. With this, the CPU 62 selects a conversion color (that is, the color indicated by the pixel value RGBrp(m,n)) for converting the pixel value RGBtp(m,n) of the object pixel TP(m,n) in target data TD.

In S210, the CPU 62 converts the pixel value RGBtp(m,n) of the pixel TP(m,n) in target data TD to the extracted pixel value RGBrp(m,n). With this, the pixel value RGBcp(m,n) of a pixel CP(m,n) in converted data CD1 coincides with the pixel value RGBrp(m,n) of the pixel RP(m,n) in reference data RD. If S210 ends, the process progresses to S220.

When it is determined that the pixel value of the pixel BP(m,n) is "0" (NO in S206), the CPU 62 skips S208 and S210, and progresses to S220. That is, the CPU 62 does not convert the pixel value RGBtp(m,n) of the pixel TP(m,n) in target data TD. With this, the pixel value RGBcp(m,n) of the pixel CP(m,n) in converted data CD1 coincides with the pixel value RGBtp(m,n) of the pixel TP(m,n) in target data TD.

S220 to S226 are the same as S120 to S126 of FIG. 3. If it is determined to be YES in S226, the synthesis conversion processing ends. With this, converted data CD1 (see FIG. 4) in which reference data RD is synthesized with target data TD is completed.

(Example of Pixel Value Conversion)

In binary data BD of FIG. 4, for example, the pixel value of a central pixel BP(1,1) among nine pixels is "1". Accordingly, the CPU 62 extracts the pixel value RGBrp(1,1) of a pixel RP(1,1) from reference data RD in S208, and converts the pixel value RGBtp(1,1) of a object pixel TP(1,1) to the pixel value RGBrp(1,1) in S210.

In binary data BD of FIG. 4, for example, the pixel value of a lower right pixel BP(2,2) among the nine pixels is "1". Accordingly, the CPU 62 extracts the pixel value RGBrp(2,2) of a pixel RP(2,2) from reference data RD in S208, and converts the pixel value RGBtp(2,2) of a object pixel TP(2,2) to the pixel value RGBrp(2,2) in S210.

A situation in which the pixel value RGBrp(1,1) and the pixel value RGBrp(2,2) are different is assumed. In this case, when converting the pixel value RGBtp(1,1) of the object pixel TP(1,1), the CPU 62 selects a first color indicated by the pixel value RGBrp(1,1) as a conversion color for the object pixel TP(1,1) (S208 of FIG. 5). When converting the pixel value RGBtp(2,2) of the object pixel TP(2,2), the CPU 62 selects a second color (that is, a color different from the first color) indicated by the pixel value RGBrp(2,2) as a conversion color for the object pixel TP(2,2) (S208). Accordingly, the CPU 62 converts the pixel value RGBtp(1,1) of the object pixel TP(1,1) to the pixel value RGBrp(1,1) indicative of the first color (S210), and converts the pixel value RGBtp(2,2) of the object pixel TP(2,2) to the pixel value RGBrp(2,2) indicative of the second color (S210). In this way, the CPU 62 can convert the pixel values of the respective object pixels in target data TD to pixel values indicative of different colors based on reference data RD.

In binary data BD of FIG. 4, the pixel value of an upper left pixel BP(0,0) among the nine pixels is "0". Accordingly, the CPU 62 does not convert the pixel value RGBtp(0,0) of a pixel TP(0,0) in target data TD (NO in S206 of FIG. 5). Accordingly, the pixel value RGBcp(0,0) of a pixel CP(0,0) in converted data CD1 coincides with the pixel value RGBtp(0,0).

Figure 6A:
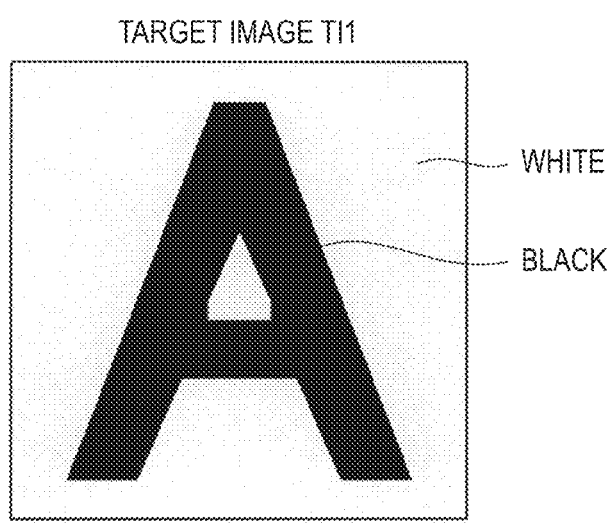
FIGS. 6A to 6C show a situation in which a target image is converted.
Figure 6B:
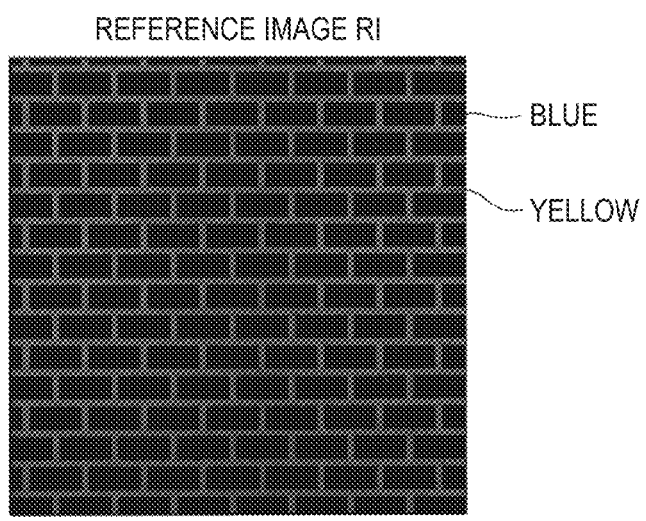
Figure 6C:
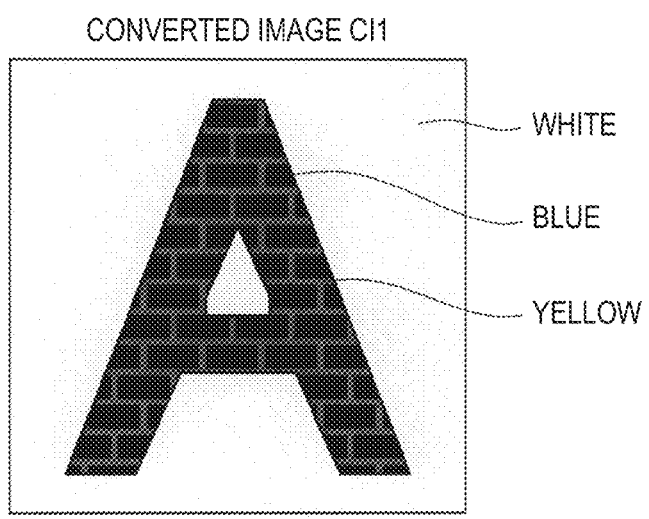

(Example of Image Conversion; FIGS. 6A to 6C)

FIG. 6A shows an example of a target image TI1 which is represented by target data TD. The target image TI1 includes a white background image, and an object image (that is, an image corresponding to an object drawn by the user in handwriting) indicative of a black character "A".

FIG. 6B shows an example of a reference image RI which is represented by reference data RD. As described above, the user selects one thumbnail image among a plurality of thumbnail images SI1 and SI2 (see FIG. 1). Then, the image processing server 50 acquires reference data RD corresponding to the selected thumbnail image (see T10 of FIG. 2). When the thumbnail image SI1 is selected by the user, the reference image RI of FIG. 6B is an image which is represented by the reference data RD acquired by the image processing server 50. The reference image RI includes a region (in FIG. 6B, a gray region) which indicates a yellow continuous line, and a region (in FIG. 6B, a black region) which indicates a plurality of blue blocks divided by the region.

In the binarization processing of S100 of FIG. 2, the image processing server 50 determines that each pixel representing the object image indicative of the character "A" among a plurality of pixels in target data TD is a object pixel having comparatively high density (YES in S108 of FIG. 3). Accordingly, in the synthesis conversion processing of S200 of FIG. 2, the image processing server 50 converts the pixel value of each object pixel representing the object image indicative of the character "A" among a plurality of pixels in target data TD using reference data RD (YES in S206, S208, and S210 of FIG. 5).

In the binarization processing of S100 of FIG. 2, the image processing server 50 determines that each pixel representing the white background image among a plurality of pixels in target data TD is a pixel having comparatively low density (NO in S108 of FIG. 3). Accordingly, in the synthesis conversion processing of S200 of FIG. 2, the image processing server 50 does not convert the pixel value of each pixel representing the background image among a plurality of pixels in target data TD (NO in S206 of FIG. 5).

If the binarization processing and the synthesis conversion processing are executed, converted data CD1 representing a converted image CI1 shown in FIG. 6C is generated. The converted image CI1 includes a white background image, and an object image which indicates the character "A" having the same pattern (that is, a yellow continuous line and a plurality of blue blocks) as the reference image RI. In other words, the converted image CI1 includes an object image which has a shape corresponding to the object drawn by the user and has the same pattern as the reference image RI having a plurality of colors.

In particular, the converted image CI1 includes an object image which has a shape corresponding to the object drawn by the user and has the same pattern as the reference image RI has a plurality of colors. According to this example, it is possible to provide the user with a sheet on which an interesting converted image CI1 is printed.

(Correspondence Relationship)

The image processing server 50 is an example of "image processing apparatus". Reference data RD representing the reference image RI of FIG. 6B is an example of "specific data". In this case, the two colors of yellow and blue are an example of "a plurality of colors". For example, the pixel TP(1,1) and the pixel TP(2,2) in target data TD of FIG. 4 are respectively examples of "first object pixel" and "second object pixel". The pixel RP(1,1) and the pixel RP(2,2) included in reference data RD of FIG. 4 are respectively examples of "first corresponding pixel" and "second corresponding pixel". In this case, the pixel value RGBrp(1,1) and the pixel value RGBrp(2,2) are respectively examples of "first value" and "second value".

The processing of S10, the processing of T10, and the processing of S100 of FIG. 2 are respectively examples of processing to be executed by "target data acquisition unit", "specific data acquisition unit", and "determination unit". The processing of S208 and the processing of S210 of FIG. 5 are respectively examples of processing to be executed by "first selection unit" and "first conversion unit". In FIG. 2, processing for transmitting converted data CD1 to the MFP 10 is an example of processing to be executed by "output unit".

Second Embodiment

In the first embodiment, the image processing server 50 executes the synthesis conversion processing using reference data RD corresponding to the thumbnail image selected by the user (see S200 of FIG. 2). In contrast, in this embodiment, the image processing server 50 executes color arrangement conversion processing using a color arrangement pattern corresponding to the thumbnail image selected by the user.

As shown in FIG. 1, the memory 64 of the image processing server 50 stores a plurality of pieces of color arrangement data 80 in advance. Each of a plurality of pieces of color arrangement data 80 is data in which a color arrangement number, a color arrangement pattern, and thumbnail data are associated with one another. The color arrangement number is the number for identifying a color arrangement pattern. The color arrangement pattern is information in which, for each of a plurality of colors, a color number (CL1, CL2, or the like) for identifying the color and an RGB value (RGBcol1, RGBcol2, or the like) representing the color are associated with each other. Thumbnail data is RGB bitmap data which represents an image having a plurality of colors indicated by a color arrangement pattern corresponding to thumbnail data.

(Processing Which is Executed by MFP 10 and Image Processing Server 50; FIG. 7)

As in the first embodiment, the user of the MFP 10 first draws an object, such as a character or a figure, on a sheet P2 of A4 size in handwriting. In the embodiment of FIG. 7, black characters indicative of the letters "ijk" are drawn on the white sheet P2. Next, the user operates the operating unit 12 of the MFP 10 to input a color arrangement instruction to the MFP 10.

If the color arrangement instruction is input, the CPU 32 of the MFP 10 transmits a thumbnail request 200 for requesting the transmission of thumbnail data to the image processing server 50.

If the thumbnail request 200 is received from the MFP 10, for each of a plurality of pieces of color arrangement data 80, the CPU 62 of the image processing server 50 generates combination data in which the color arrangement number and thumbnail data included in the color arrangement data 80 are associated with each other. As a result, the CPU 62 generates a plurality of pieces of combination data 210 from a plurality of pieces of color arrangement data 80. Then, the CPU 62 transmits a plurality of pieces of combination data 210 to the MFP 10.

If a plurality of pieces of combination data 210 are received from the image processing server 50, the CPU 32 of the MFP 10 displays a plurality of thumbnail images, which are represented by a plurality of pieces of thumbnail data included in a plurality of pieces of combination data 210, on the display unit 14.

FIG. 1 shows an example of thumbnail images SI3 and SI4 which are displayed in this embodiment. Each of the thumbnail images SI3 and SI4 includes three regions having three colors. The user operates operating unit 12 to select one thumbnail image while viewing the thumbnail images SI3 and SI4 displayed on the display unit 14.

As shown in FIG. 7, if one thumbnail image is selected by the user, the CPU 32 of the MFP 10 supplies an instruction to scan the sheet P2 to the scanning execution unit 22. With this, the scanning execution unit 22 executes color scanning of the sheet P2 of A4 size to generate scan data SD2 having the number of pixels (that is, K1 pixels) corresponding to A4 size.

Next, the CPU 32 of the MFP 10 acquires the color arrangement number which is associated with thumbnail data representing the selected thumbnail image among a plurality of pieces of combination data 210. Then, the CPU 32 transmits a conversion instruction 220 including scan data SD2 and the acquired color arrangement number to the image processing server 50.

If the conversion instruction 220 is received from the MFP 10, as in the first example, the CPU 62 of the image processing server 50 sequentially executes the reduction processing of S10 and the binarization processing of S100 to sequentially generate target data TD and binary data BD. As in the first example, each of target data TD and binary data BD has the number of pixels (that is, K2 pixels) corresponding to postcard size.

Next, in S300, the CPU 62 of the image processing server 50 executes labeling processing using binary data BD. With this, the CPU 62 generates label data LD having K2 pixels.

Next, in T20, the CPU 62 of the image processing server 50 acquires one color arrangement pattern COP associated with the color arrangement number included in the conversion instruction 220 among a plurality of color arrangement patterns included in a plurality of pieces of color arrangement data 80.

Figure 8:
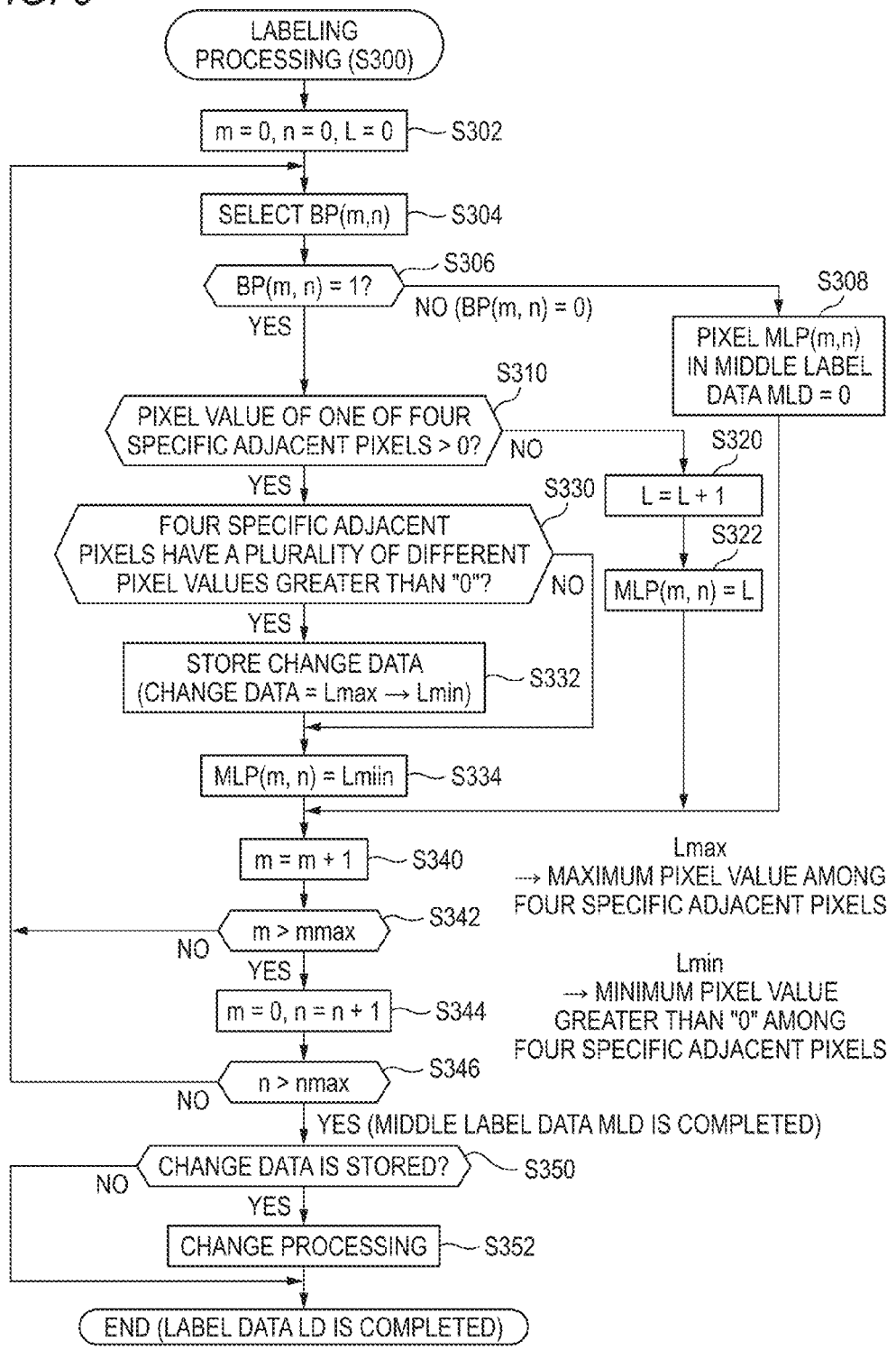
FIG. 8 is a flowchart of labeling processing.

(Labeling Processing; FIG. 8)

Subsequently, the details of the labeling processing of S300 of FIG. 7 will be described referring to FIG. 8. The labeling processing is executed to sort the object pixels in target data TD into a plurality of pixel groups. In the labeling processing, first, middle label data MLD is generated from binary data BD, and thereafter, label data LD is generated from middle label data MLD.

Figure 9:
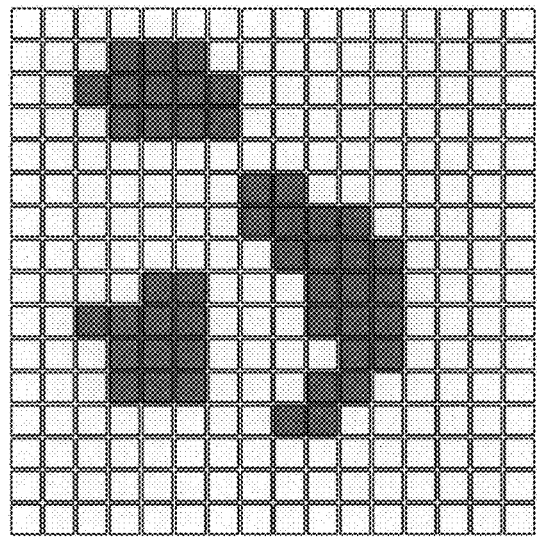
FIG. 9 shows target data and binary data.

Hereinafter, the details of the labeling processing will be described as to a case where target data TD and binary data BD shown in FIG. 9 are generated. One box in each of data TD and BD of FIG. 9 indicates one pixel. In target data TD, a box which is colored with gray indicates a pixel (that is, a object pixel) which has density equal to or higher than predetermined density, and a white box indicates a pixel which has density lower than predetermined density. In binary data BD, the pixel value (that is, "1" or "0") according to the density of each pixel in target data TD is described.

In S302 of FIG. 8, the CPU 62 of the image processing server 50 sets the value of each of the pointers m and n indicative of the position of the pixel to "0", and sets the value of the pointer L to "0". In S304, the CPU 62 selects one pixel BP(m,n) included in binary data BD. Then, in S306, the CPU 62 performs determination about whether or not the pixel value of the pixel BP(m,n) is "1".

When it is determined that the pixel value of the pixel BP(m,n) is "0" (that is, NO in S306), in S308, the CPU 62 stores "0" as the pixel value of a pixel MLP(m,n) in middle label data MLD. If S308 ends, the process progresses to S340.

Figure 10:
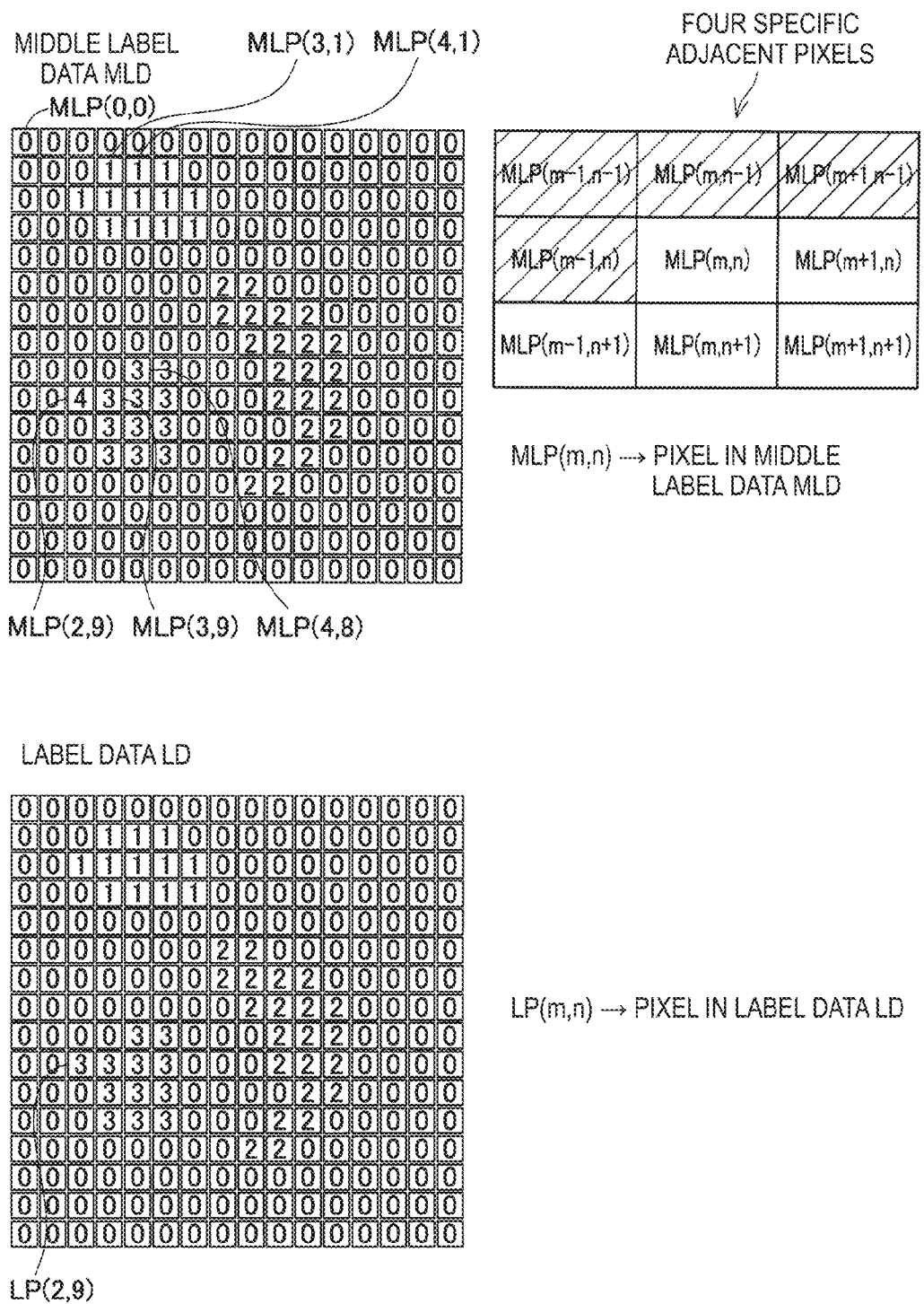
FIG. 10 shows middle label data and label data.

FIG. 10 shows an example of middle label data MLD. For example, in binary data BD of FIG. 9, the pixel value of a pixel BP(0,0) is "0". Accordingly, when the pixel BP(0,0) is selected in S304 of FIG. 8, the CPU 62 determines to be NO in S306, and stores "0" as the pixel value of a pixel MLP(0,0) in middle label data MLD in S308.

In S306 of FIG. 8, when it is determined that the pixel value of the pixel BP(m,n) is "1" (YES in S306), in S310, the CPU 62 performs determination about whether or not the pixel value of one of four specific adjacent pixels is greater than "0".

The four specific adjacent pixels will be described referring to FIG. 10. In a stage in which the pixel value of the pixel MLP(m,n) in middle label data MLD should be decided, the pixel value of each of four pixels (that is, four hatched pixels) among eight pixels adjacent to the pixel MLP(m,n) is already decided. The four pixels in which the pixel value is already decided are the four specific adjacent pixels.

In S310 of FIG. 8, when it is determined that the pixel values of all of the four specific adjacent pixels are "0" (NO in S310), in S320, the CPU 62 adds "1" to the current value of the pointer L to set a new value of the pointer L. Then, in S322, the CPU 62 stores the value of the pointer L as the pixel value of the pixel MLP(m,n) in middle label data MLD. If S322 ends, the process progresses to S340.

For example, in a stage where the pixel value of a pixel MLP(3,1) in middle label data MLD of FIG. 10 should be decided, the pixel values of all of the four specific adjacent pixels are "0", and the value of the pointer L is "0". Accordingly, when the pixel BP(3,1) is selected in S304 of FIG. 8, the CPU 62 determines to be NO in S310, sets "1" as the value of the pointer L in S320, and stores "1" as the pixel value of the pixel MLP(3,1) in S322.

For example, in a stage where the pixel value of a pixel MLP(2,9) in middle label data MLD of FIG. 10 should be decided, the pixel values of all of the four specific adjacent pixels are "0", and the value of the pointer L is "3". Accordingly, when the pixel BP(2,9) is selected in S304 of FIG. 8, the CPU 62 determines to be NO in S310, sets "4" as the value of the pointer L in S320, and stores "4" as the pixel value of the pixel MLP(2,9) in S322.

In S310 of FIG. 8, when it is determined that the pixel value of one of the four specific adjacent pixels is greater than "0" (YES in S310), in S330, the CPU 62 performs determination about whether or not the four specific adjacent pixels have a plurality of different pixel values greater than "0".

When it is determined that the four specific adjacent pixels have a plurality of different pixel values greater than "0" (YES in S330), in S332, the CPU 62 stores change data. Change data is data which indicates that a maximum pixel value Lmax greater than "0" among the four pixel values of the four specific adjacent pixels should be changed to a minimum pixel value Lmin greater than "0".

Next, in S334, the CPU 62 stores the minimum pixel value Lmin greater than "0" among the four pixel values of the four specific adjacent pixels as the pixel value of the pixel MLP (m,n) in middle label data MLD. If S334 ends, the process progresses to S340.

For example, in a stage where the pixel value of the pixel MLP(3,9) in middle label data MLD of FIG. 10 should be decided, the pixel value of a specific adjacent pixel MLP(4,8) is "3", the pixel value of a specific adjacent pixel MLP(2,9) is "4", and the pixel values of the other two specific adjacent pixels are "0". Accordingly, when the pixel BP(3,9) is selected in S304 of FIG. 8, the CPU 62 determines to be YES in S310, and determines to be YES in S330. Then, in S332, the CPU 62 stores change data which indicates that the pixel value "4 (that is, Lmax)" greater than "0" among the four pixel values of the four specific adjacent pixels should be changed to the minimum pixel value "3 (that is, Lmin)" greater than "0". Next, in S334, the CPU 62 stores the minimum pixel value "3" greater than "0" among the four pixel values of the four specific adjacent pixels as the pixel value of the pixel MLP(3,9).

In S330 of FIG. 8, when it is determined that the four specific adjacent pixels do not have a plurality of different pixel values greater than "0" (NO in S330), the CPU 62 skips S332, and stores the pixel value Lmin as the pixel value of the pixel MLP(m,n) in middle label data MLD in S334.

For example, in a stage where the pixel value of a pixel MLP(4,1) in middle label data MLD of FIG. 10 should be decided, the pixel value of the specific adjacent pixel MLP(3,1) is "1", and the pixel values of the other three specific adjacent pixels MLP are "0". Accordingly, when the pixel BP(4,1) is selected in S304 of FIG. 8, the CPU 62 determines to be NO in S330, and stores the minimum pixel value "1" greater than "0" among the four pixel values of the four specific adjacent pixels as the pixel value of the pixel MLP (4,1) in S334.

S340 to S346 are the same as S120 to S126 of FIG. 3. If it is determined to be YES in S346, middle label data MLD is completed. In this case, in S350, the CPU 62 performs determination about whether or not change data is stored in S332.

When it is determined that change data is stored in S332 (YES in S350), in S352, the CPU 62 executes change processing for changing middle label data MLD according to change data to generate label data LD. For example, when change data which indicates that the pixel value "4" should be changed to the pixel value "3" is stored, the CPU 62 changes the pixel value "4" of the pixel MLP(2,9) in middle label data MLD of FIG. 10 to the pixel value "3". With this, label data LD which includes a pixel LP(2,9) having the pixel value "3" after change is generated (see label data LD of FIG. 10). If S352 ends, the labeling processing ends.

When it is determined that change data is not stored in S332 (NO in S350), the CPU 62 skips S352 and ends the labeling processing. In this case, label data LD which coincides with middle label data MLD is completed.

If the labeling processing ends, the object pixels in target data TD are sorted into a plurality of pixel groups. One pixel group has object pixels which are at the positions corresponding to the pixels in label data LD having the same pixel value. Hereinafter, each pixel group is referred to as "a pixel group corresponding to a pixel value L (for example, pixel value "1")" using the pixel value L (for example, pixel value "1") in label data LD.

Figure 11:
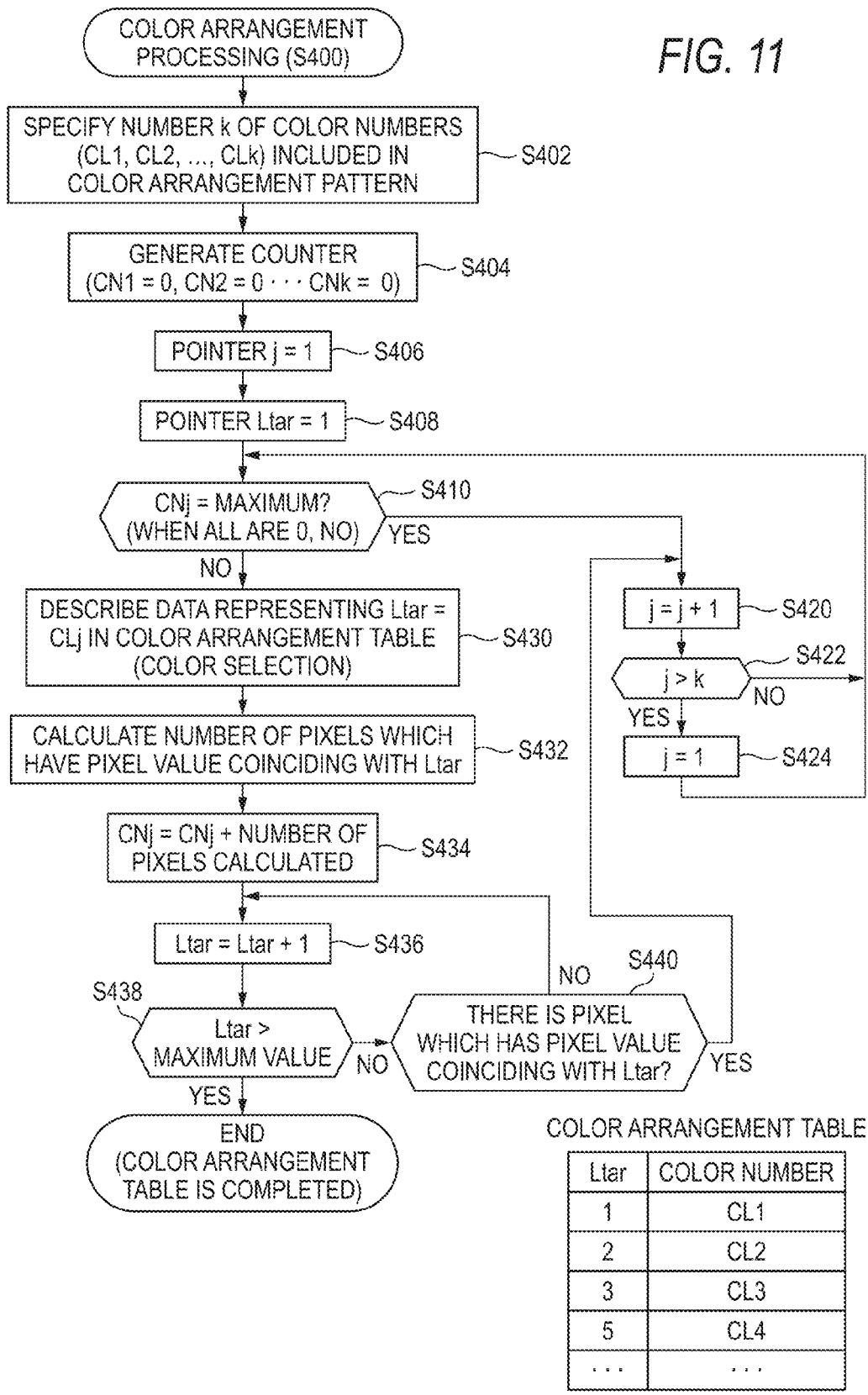
FIG. 11 is a flowchart of color arrangement processing.

(Color Arrangement Processing; FIG. 11)

Subsequently, the details of color arrangement processing of S400 of FIG. 7 will be described referring to FIG. 11. In S402, the CPU 62 of the image processing server 50 specifies the number k of color numbers (that is, CL1, CL2, ..., CLk) included in the color arrangement pattern COP in T20 of FIG. 7. Next, in S404, the CPU 62 generates k counters (that is, CN1, CN2, ..., CNk). Specifically, the CPU 62 generates the counters CN1 to CNk corresponding to the color numbers CL1 to CLk included in the color arrangement pattern COP. The CPU 62 sets "0" as the initial value of each of the counters CN1 to CNk.

Next, in S406, the CPU 62 sets "1" as the value of a pointer j. Next, in S408, the CPU 62 sets "1" as the value of a pointer Ltar. Then, in S410, the CPU 62 performs determination about whether or not the count value of the counter CNj is maximal among the k counters.

When the CPU 62 performs determination that the count value of the counter CNj is maximal (YES in S410), in S420, the CPU 62 adds "1" to the current value of the pointer j to set a new value of the pointer j.

Next, in S422, the CPU 62 performs determination about whether or not the value of the pointer j is greater than k. When it is determined that the value of the pointer j is greater than k (YES in S442), in S424, the CPU 62 sets the value of the pointer j to "1". If S424 ends, the process returns to S410. When it is determined that the value of the pointer j is equal to or less than k (NO in S442), the CPU 62 skips S424 and returns to S410.

When it is determined that the count value of the counter CNj is not maximal (NO in S410), the CPU 62 progresses to S430. When the count values of all of the k counters are "0", the CPU 62 determines that the count value of the counter CNj is not maximal (NO in S410), and progresses to S430.

In S430, the CPU 62 describes information (for example, information in which "Ltar=1" and "CL1" associated with each other), in which the value of the pointer Ltar and the color number CLj are associated with each other, in the color arrangement table. With this, the CPU 62 selects a conversion color (that is, a color corresponding to the color number CLj) for a pixel group which corresponds to a pixel value coinciding with the value of the pointer Ltar.

In S432, the CPU 62 calculates the number of pixels, which have the pixel value coinciding with the value of the pointer Ltar, referring to label data LD. In S434, the CPU 62 adds the number of pixels calculated in S432 to the current value of the counter CNj. In S436, the CPU 62 adds "1" to the current value of the pointer Ltar to set a new value of the pointer Ltar.

In S438, the CPU 62 performs determination about whether or not the value of the pointer Ltar is greater than the maximum pixel value included in label data LD. When it is determined that the value of the pointer Ltar is equal to or less than the maximum pixel value (NO in S438), in S440, the CPU 62 performs determination about whether or not there is a pixel, which has the pixel value coinciding with the value of the pointer Ltar, in label data LD. When it is determined that there is a pixel, which has the pixel value coinciding with the value of the pointer Ltar, in label data LD (YES in S440), the CPU 62 progresses to S420.

In S440, when it is determined that there is no pixel, which has the pixel value coinciding with the value of the pointer Ltar, in label data LD (NO in S440), the CPU 62 returns to S436. For example, in S332 of FIG. 8, when change data which indicates that the pixel value "4" should be changed to the pixel value "3" is stored, in S352, label data LD in which the pixel value "4" is changed to the pixel value "3" is generated, and thus, there is no pixel, which has the pixel value "4", in label data LD. In this case, in S440 of FIG. 11, the CPU 62 determines that the there is no pixel, which has the pixel value coinciding with the value "4" of the pointer Ltar, in label data LD (NO in S440).

In S438, when it is determined that the value of the pointer Ltar is greater than the maximum pixel value (YES in S438), the CPU 62 ends the color arrangement processing. With this, the color arrangement table is completed.

Figure 12:
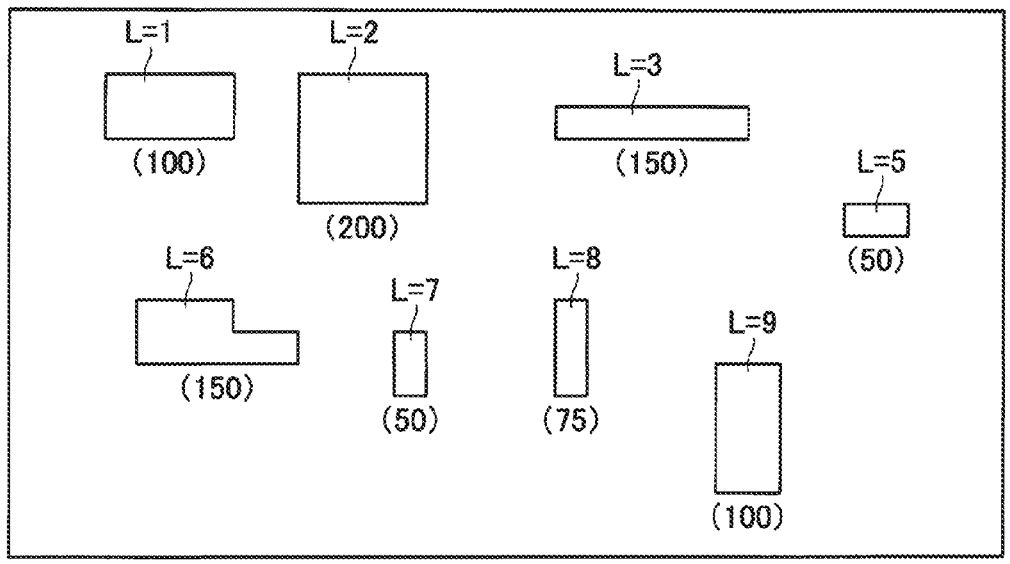
FIG. 12 shows a situation in which a count value of each counter is changed.

(Example of Color Arrangement Processing; FIG. 12)

Subsequently, a specific example of the color arrangement processing will be described referring to FIG. 12. A region surrounded by a rectangle in label data LD of FIG. 12 indicates a plurality of pixels which have the same pixel value. "L=1", "L=2", or the like indicates the pixel value of each pixel, and (100), (200), or the like indicates the number of pixels. A table (of the second example) of FIG. 12 shows a situation in which the value of the pointer Ltar, the value of the pointer j, and the count values of the counters CN1 to CN5 are changed. In the example of FIG. 12, the number k of color numbers CL1 to CL5 included in the color arrangement pattern COP is "5", and there are five counters CN1 to CN5.

When "Ltar=1" and "j=1" (S406 and S408 of FIG. 11), in S430, information associated with "Ltar=1" and the color number CL1 is described in the color arrangement table. That is, a color corresponding to the color number CL1 is selected as a conversion color for the pixel group corresponding to the pixel value "1". Then, in S434, the number of pixels "100" is added to the counter CN1.

Next, "Ltar=2" is set in S436, and "j=2" is set in S420. As a result, under a condition in which "Ltar=2" and "j=2", the respective kinds of processing after S410 are executed. That is, in S430, information associated with "Ltar=2" and the color number CL2 is described in the color arrangement table. Then, in S434, the number of pixels "200" is added to the counter CN2.

Similarly, when "Ltar=3" and "j=3", in S430, information associated with "Ltar=3" and the color number CL3 is described in the color arrangement table. Then, in S434, the number of pixels "150" is added to the counter CN3.

When "Ltar=4" and "j=4", there is no pixel, which has the pixel value "4", in label data LD. For this reason, it is determined to be NO in S440, and "Ltar=5" is set in S436 (see "Ltar=4→5" in the table of FIG. 12). As a result, under a condition in which "Ltar=5" and "j=4", the respective kinds of processing after S410 are executed. That is, in S430, information associated with "Ltar=5" and the color number CL4 is described in the color arrangement table. Then, in S434, the number of pixels "50" is added to the counter CN4.

When "Ltar=6" and "j=5", in S430, information associated with "Ltar=6" and the color number CL5 is described in the color arrangement table. Then, in S434, the number of pixels "150" is added to the counter CN5.

The number k of color numbers CL1 to CL5 included in the color arrangement pattern COP is "5". Accordingly, if "j=6" is set, it is determined to be YES in S422, and "j=1" is set in S424. As a result, under a condition in which "Ltar=7" and "j=1", the respective kinds of processing after S410 are executed. That is, in S430, information associated with "Ltar=7" and the color number CL1 is described in the color arrangement table. Then, in S434, the number of pixels "50" is added to the counter CN1.

If the number of pixels "50" is added to the counter CN1 under a condition in which "Ltar=7" and "j=1", the value of the counter CN2 corresponding to "j=2" among the five values of the counters CN1 to CN5 becomes maximum. Accordingly, when "Ltar=8" and "j=2", it is determined to be YES in S410, and "j=3" is set in S420 (see "j=2→3" in the table of FIG. 12). As a result, under a condition in which "Ltar=8" and "j=3", the respective kinds of processing after S410 are executed. That is, in S430, information associated with "Ltar=8" and the color number CL3 is described in the color arrangement table. Then, in S434, the number of pixels "75" is added to the counter CN3.

Similarly, when "Ltar=9" and "j=4", in S430, information associated with "Ltar=9" and the color number CL4 is described in the color arrangement table. Then, in S434, the number of pixels "100" is added to the counter CN4.

As described above, in the color arrangement processing of this example, when "Ltar=8" and "j=2", the value of the counter CN2 corresponding to "j=2" is maximal. For this reason, the CPU 62 sets "j=3". That is, the CPU 62 selects a color (that is, a color corresponding to the color number CL3) corresponding to the counter CN3 as a conversion color for a pixel group corresponding to the pixel value "8" (YES in S410 of FIG. 11), without selecting a color (that is, a color corresponding to the color number CL2) corresponding to the counter CN2 having the maximum count value. Since the CPU 62 executes this kind of processing (that is, the determination processing of S410 of FIG. 11), it is possible to suppress an increase in variation in the number of pixels in which the colors corresponding to the color numbers CL1 to CL5 are selected. As a result, the CPU 62 can suppress an increase in variation in size of five regions having five colors in a converted image represented by converted data CD2 generated in color arrangement conversion processing described below.

Figure 13:
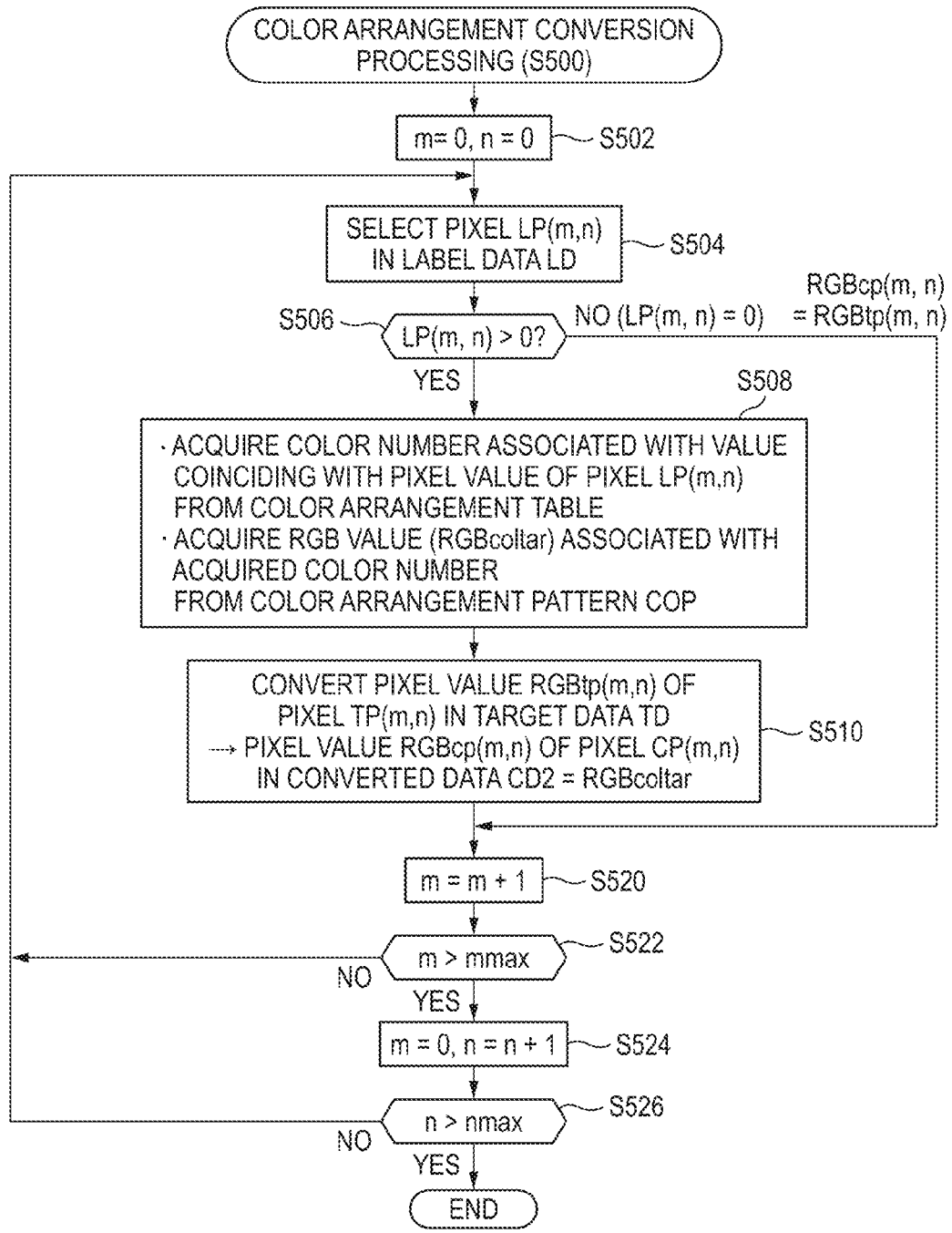
FIG. 13 is a flowchart of color arrangement conversion processing.

(Color Arrangement Conversion Processing; FIG. 13)

Subsequently, the details of color arrangement conversion processing of S500 of FIG. 7 will be described with reference to FIG. 13. In S502, the CPU 62 of the image processing server 50 sets the value of each of the pointers m and n indicative of the position of the pixel to "0". In S504, the CPU 62 selects one pixel LP(m,n) in label data LD. In S506, the CPU 62 performs determination about whether or not the pixel value of the pixel LP(m,n) is greater than "0". That is, the CPU 62 performs determination about whether or not the pixel TP(m,n) is a object pixel.

When it is determined that the pixel value of the pixel LP(m,n) is greater than "0" (YES in S506), in S508, the CPU 62 acquires a color number from the color arrangement table generated in the color arrangement processing of FIG. 11. Specifically, the CPU 62 acquires a color number, with which a value coinciding with the pixel value of the pixel LP(m,n) is associated, from the color arrangement table. Next, the CPU 62 acquires an RGB value associated with the acquired color number from the color arrangement pattern COP acquired in T20 of FIG. 7. Hereinafter, the RGB value acquired at this time is described as "RGBcoltar".

In S510, the CPU 62 converts the pixel value RGBtp(m,n) of the object pixel TP(m,n) in target data TD to RGBcoltar. With this, the pixel value RGBcp(m,n) of the pixel CP(m,n) in converted data CD2 coincides with RGBcoltar. If S510 ends, the process progresses to S520.

When it is determined that the pixel value of the pixel BP(m,n) is "0" (YES in S506), the CPU 62 skips S508 and S510, and progresses to S520. That is, the CPU 62 does not convert the pixel value RGBtp(m,n) of the pixel TP(m,n). With this, the pixel value RGBcp(m,n) of the pixel CP(m,n) in converted data CD2 coincides with the pixel value RGBtp(m, n) of the pixel TP(m,n) in target data TD.

S520 to S526 are the same as S120 to S126 of FIG. 3. If it is determined to be YES in S526, the color arrangement conversion processing ends. With this, converted data CD2 in which each color indicated by the colors color arrangement pattern COP is arranged in each pixel group in target data TD is completed.

Figure 14A:
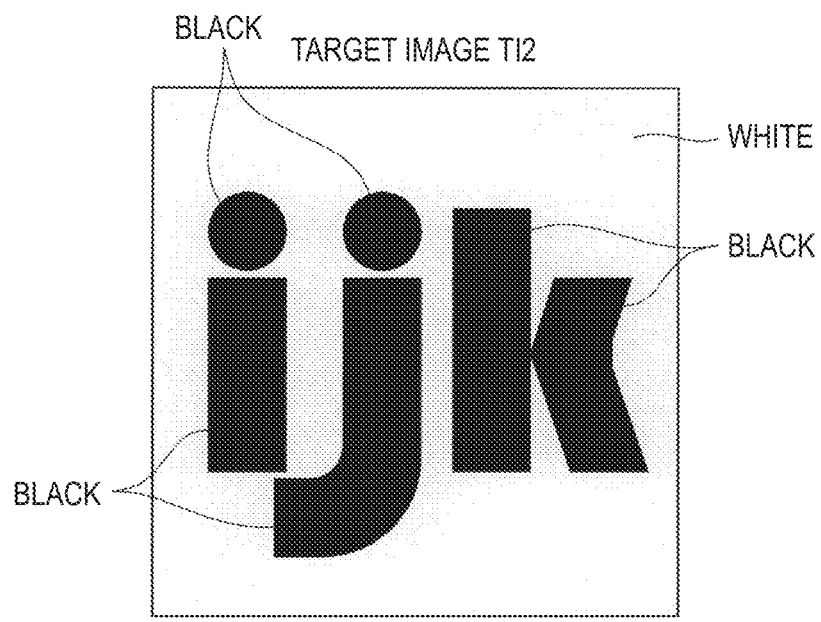
FIGS. 14A and 14B show a situation in which a target image is converted.
Figure 14B:
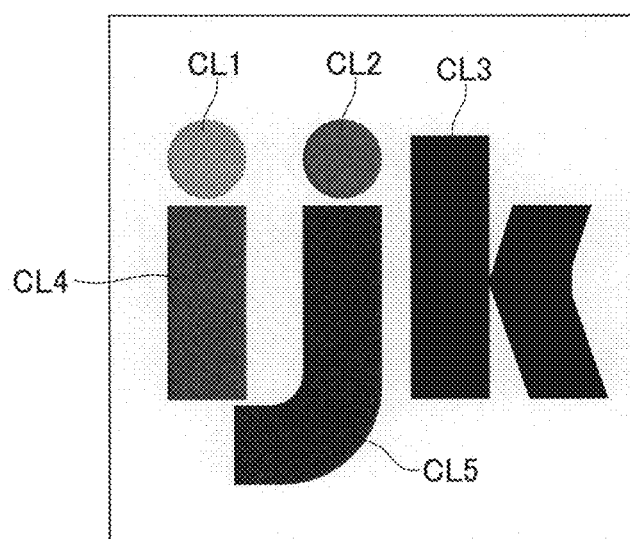

(Example of Image Conversion; FIGS. 14A and 14B)

FIG. 14A shows an example of a target image TI2 represented by target data TD. The target image TI2 includes a white background image, and five object images indicative of black characters "ijk". One object image means an image in which black is continued. Accordingly, each of an upper portion and a lower portion of the character "i" corresponds to one object image. Similarly, each of an upper portion and a lower portion of the character "j" corresponds to one object image.

In the binarization processing of S100 of FIG. 7, the image processing server 50 performs determination about whether or not each pixel representing each of the object images indicative of the characters "ijk" among a plurality of pixels included in target data TD is a object pixel (YES in S108 of FIG. 3).

In the labeling processing of S300 of FIG. 7, the image processing server 50 sorts the object pixels in target data TD into five pixel groups (see FIG. 8). That is, the image processing server 50 performs sorting into five pixel groups representing five object images.

In the color arrangement processing of S400 of FIG. 7, the image processing server 50 selects a color corresponding to each of the color numbers CL1 to CL5 as each conversion color for each pixel group in target data TD (see S430 of FIG. 11).

In the color arrangement conversion processing of S500 of FIG. 7, for each of the pixel groups in target data TD, the image processing server 50 converts the pixel value of each of all object pixels forming the pixel group to a value indicative of the selected color (S508 and S510 of FIG. 13).

If the respective kinds of processing are executed, converted data CD2 which represents a converted image CI2 shown in FIG. 14B is generated. The converted image CI2 includes a white background image, and five object images having five colors corresponding to the color numbers CL1 to CL5. In other words, the converted image CI2 includes five object images which have the shapes corresponding to the objects "ijk" drawn by the user and in which a plurality of different colors are arranged. In this example, it is possible to provide the user with a sheet on which an interesting converted image CI2 is printed.

(Correspondence Relationship)

In target data TD representing target image TI2 of FIG. 14A, the five pixel groups are an example of "N pixel groups". For example, a pixel group which represents an object image indicative of the upper portion of the character "i" and a pixel group which represents an object image indicative of the lower portion of the character "i" are respectively examples of "first pixel group" and "second pixel group". Then, one object pixel included in the former pixel group and one object pixel included in the latter pixel group are respectively examples of "first object pixel" and "second object pixel". A conversion color (that is, a color corresponding to the color number CL1) for the former pixel group and a conversion color (that is a color corresponding to the color number CL4) for the latter pixel group are respectively examples of "first color" and "second color". The k colors specified in S402 of FIG. 11 are an example of "M colors".

The processing of S300, the processing of S400, and the processing of S500 of FIG. 7 are respectively examples of processing to be executed by "sorting unit", "first selection unit", and "first conversion unit". In FIG. 7, the processing for transmitting converted data CD2 to the MFP 10 is an example of processing to be executed by "output unit". A method including the determination processing of S410 of FIG. 11 is an example of "predetermined method".

Third Example

FIG. 15

Figure 15:
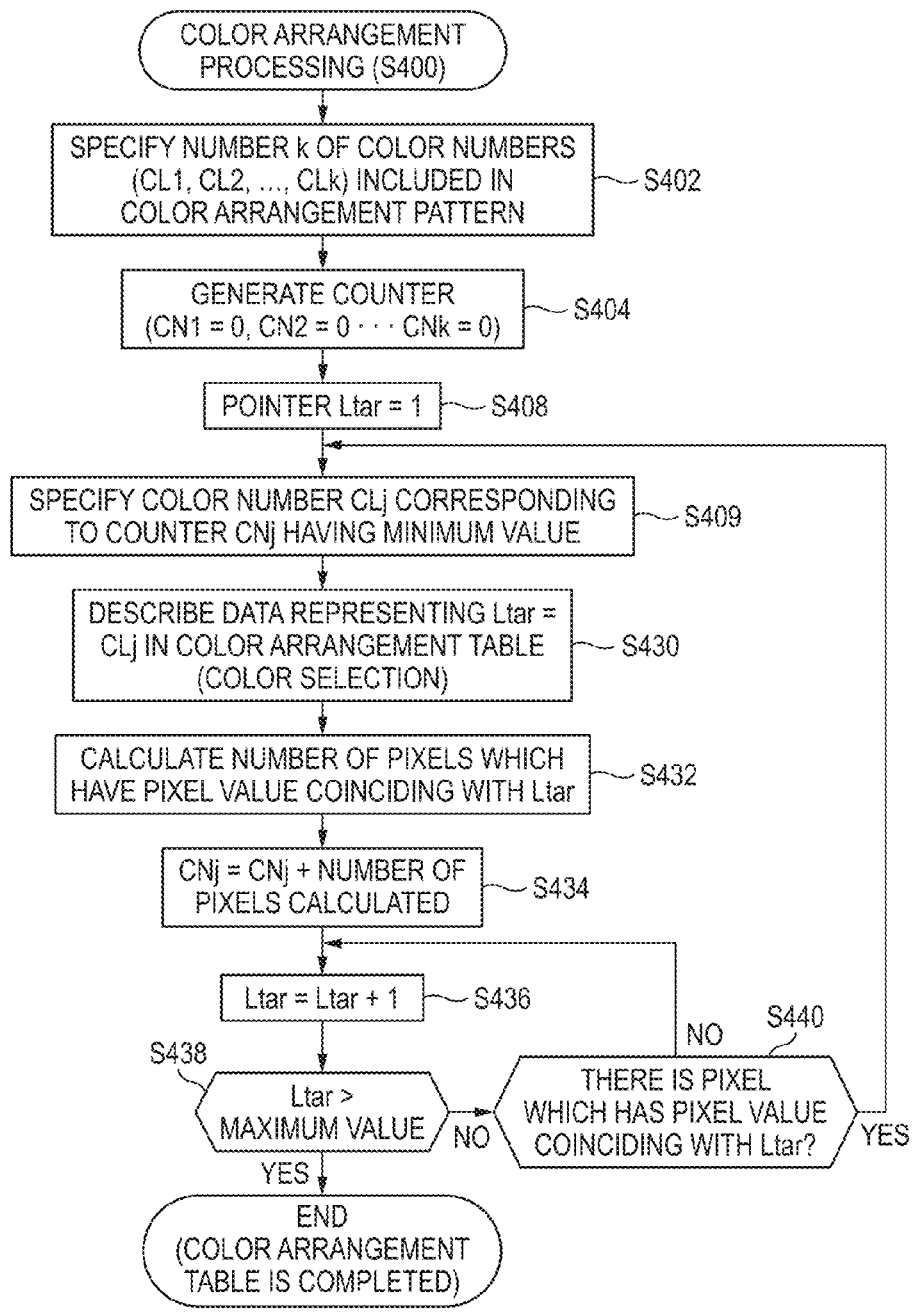
FIG. 15 is a flowchart of color arrangement processing of a third example.

In this example, the details of the color arrangement processing of S400 of FIG. 7 are different from those in the second example. The details of the color arrangement processing of this example will be described referring to FIG. 15. In FIG. 15, the same kinds of processing as in FIG. 11 are represented by the same step numbers as in FIG. 11. Hereinafter, the details of processing of S409 different from those in FIG. 11 will be described.

In S409, the CPU 62 of the image processing server 50 first specifies the counter CNj having the minimum count value among the counters CN1 to CNk. When there are two or more counters having the minimum count value, the CPU 62 specifies one counter CNj, in which the value of "j" is minimal, among the two or more counters. Then, the CPU 62 specifies the color number CLj corresponding to the counter CNj.

The other kinds of processing of FIG. 15 are the same as the respective kinds of processing of FIG. 11, except that S406, S410, and S420 to S424 of FIG. 11 are not executed.

(Example of Color Arrangement Processing; FIG. 12)

As will be understood by comparison of the table (of the second example) of FIG. 12 and a table (of the third example), in this example, when Ltar is "1" to "6", as in the second example, the color numbers CL1 are CL5 are sequentially described in the color arrangement table, and the counters CN1 to CN5 are increased.

In a stage in which the processing of S409 to S440 of FIG. 15 ends for "Ltar=6", the count value "50" of the counter CN4 is minimal. Accordingly, when "Ltar=7", the counter CN4 (that is, "j"=4) is specified in S409, and information associated with "Ltar=7" and the color number CL4 is described in the color arrangement table in S430. Then, in S434, the number of pixels "50" is added to the counter CN4, and the count value of the counter CN4 becomes "100".

In a stage in which the processing of S409 to S440 of FIG. 15 ends for "Ltar=7", the count value "100" of each of the two counters CN1 and CN4 is minimal. Accordingly, when "Ltar=8", the counter CN1 (that is, "j"=1) is specified in S409, and information associated with "Ltar=8" and the color number CL1 is described in the color arrangement table in S430. Then, in S434, the number of pixels "75" is added to the counter CN1, and the count value of the counter CN1 becomes "175".

Similarly, when "Ltar=9", the counter CN4 (that is, "j"=4) is specified in S409, and information associated with "Ltar=9" and the color number CL4 is described in the color arrangement table in S430. Then, in S434, the number of pixels "100" is added to the counter CN1, and the count value of the counter CN1 becomes "200".

As described above, in the color arrangement processing of this example, the CPU 62 specifies the color number CLj corresponding to the counter CNj having the minimum count value in S409, and selects a color corresponding to the color number CLj as a conversion color in S430. In this example, the CPU 62 can suppress an increase in variation in the number of pixels in which the colors corresponding to the color numbers CL1 to CL5 are selected. As a result, the CPU 62 can suppress an increase in variation in size of five regions having five colors in the converted image represented by the converted data CD2. In this example, a method including the processing of S409 of FIG. 15 is an example of "predetermined method".

Fourth Example

FIG. 16

In this example, although the image processing server 50 automatically decides to execute either synthesis conversion processing or color arrangement conversion processing.

Figure 16:
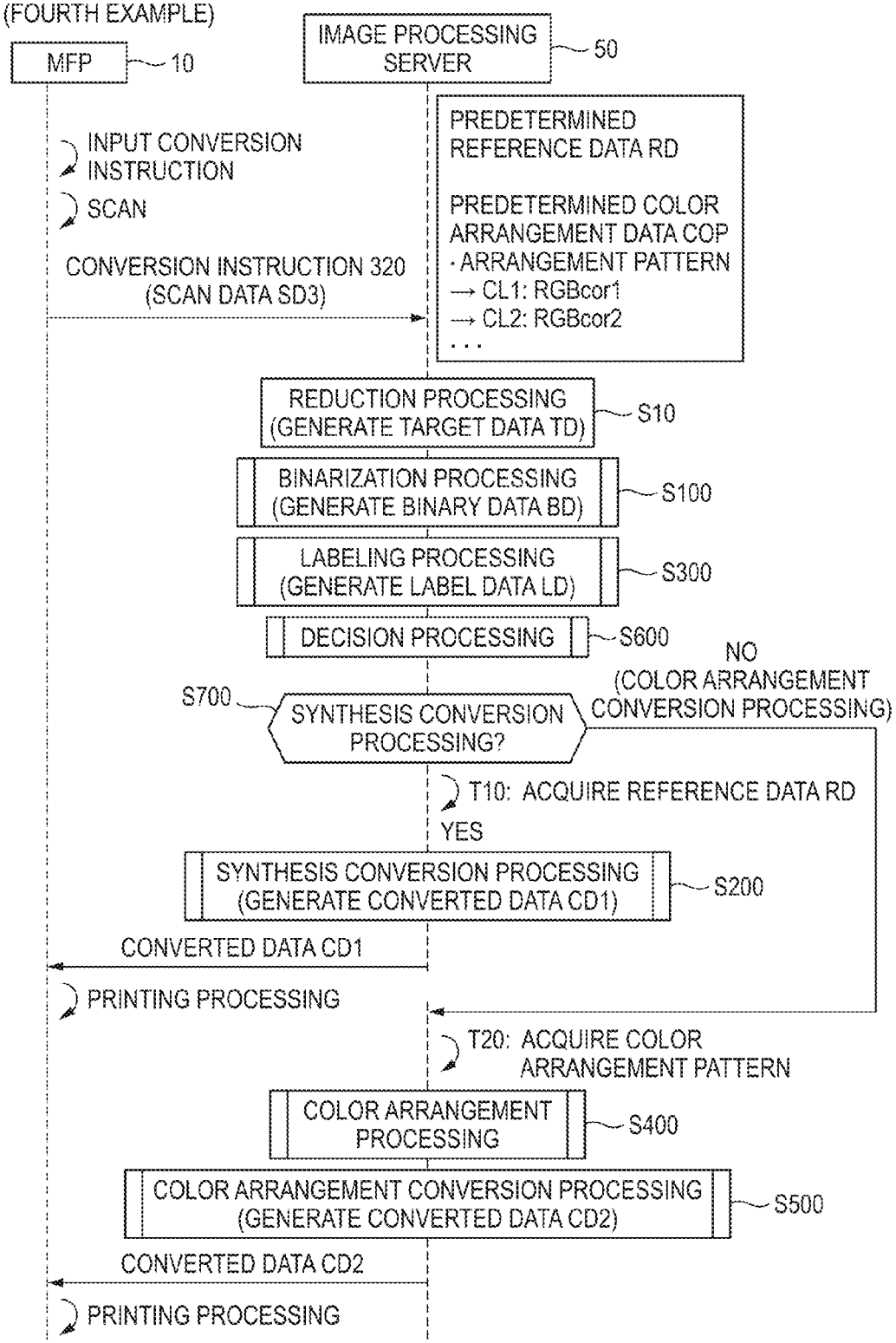
FIG. 16 is a sequence diagram of a fourth example.

Unlike the above-described examples, the memory 64 of the image processing server 50 does not store a plurality of pieces of synthesis data 70 and a plurality of pieces of color arrangement data 80. As shown in FIG. 16, the memory 64 of the image processing server 50 stores one piece of reference data RD and one piece of color arrangement pattern COP determined in advance.

As in the above-described examples, the user of the MFP 10 first draws an object, such as a character or a figure, on a sheet of A4 size and operates the operating unit 12 of the MFP 10 to input a conversion instruction to the MFP 10.

If the conversion instruction is input, the CPU 32 of the MFP 10 supplies an instruction to scan the sheet to the scanning execution unit 22. With this, the scanning execution unit 22 executes color scanning of the sheet of A4 size to generate scan data SD3 including K1 pixels. Next, the CPU 32 of the MFP 10 transmits a conversion instruction 320 including scan data SD3 to the image processing server 50.

If the conversion instruction 320 is received from the MFP 10, as in the above-described examples, the CPU 62 of the image processing server 50 sequentially executes the reduction processing of S10, the binarization processing of S100, and the labeling processing of S300 to sequentially generate target data TD, binary data BD, and label data LD.

Next, in S600, the CPU 62 of the image processing server 50 executes decision processing for deciding to execute either synthesis conversion processing or color arrangement conversion processing using label data LD. Then, in S700, the CPU 62 performs determination about whether or not the result of the decision processing is the synthesis conversion processing.

When it is determined that the result of the decision processing is the synthesis conversion processing (YES in S700), in T10, the CPU 62 of the image processing server 50 acquires reference data RD from the memory 64. Then, in S200, as in the first example, the CPU 62 executes the synthesis conversion processing (see FIG. 5) to generate converted data CD1. The subsequent processing is the same as in the first example.

When it is determined that the result of the decision processing is the color arrangement conversion processing (NO in S700), in T20, the CPU 62 of the image processing server 50 acquires the color arrangement pattern COP from the memory 64. Then, in S400, as in the second example or the third example, the CPU 62 executes the color arrangement processing and the color arrangement conversion processing (see FIGS. 11, 13, and 15) to generate converted data CD2. The subsequent processing is the same as in the second example.

Figure 17:
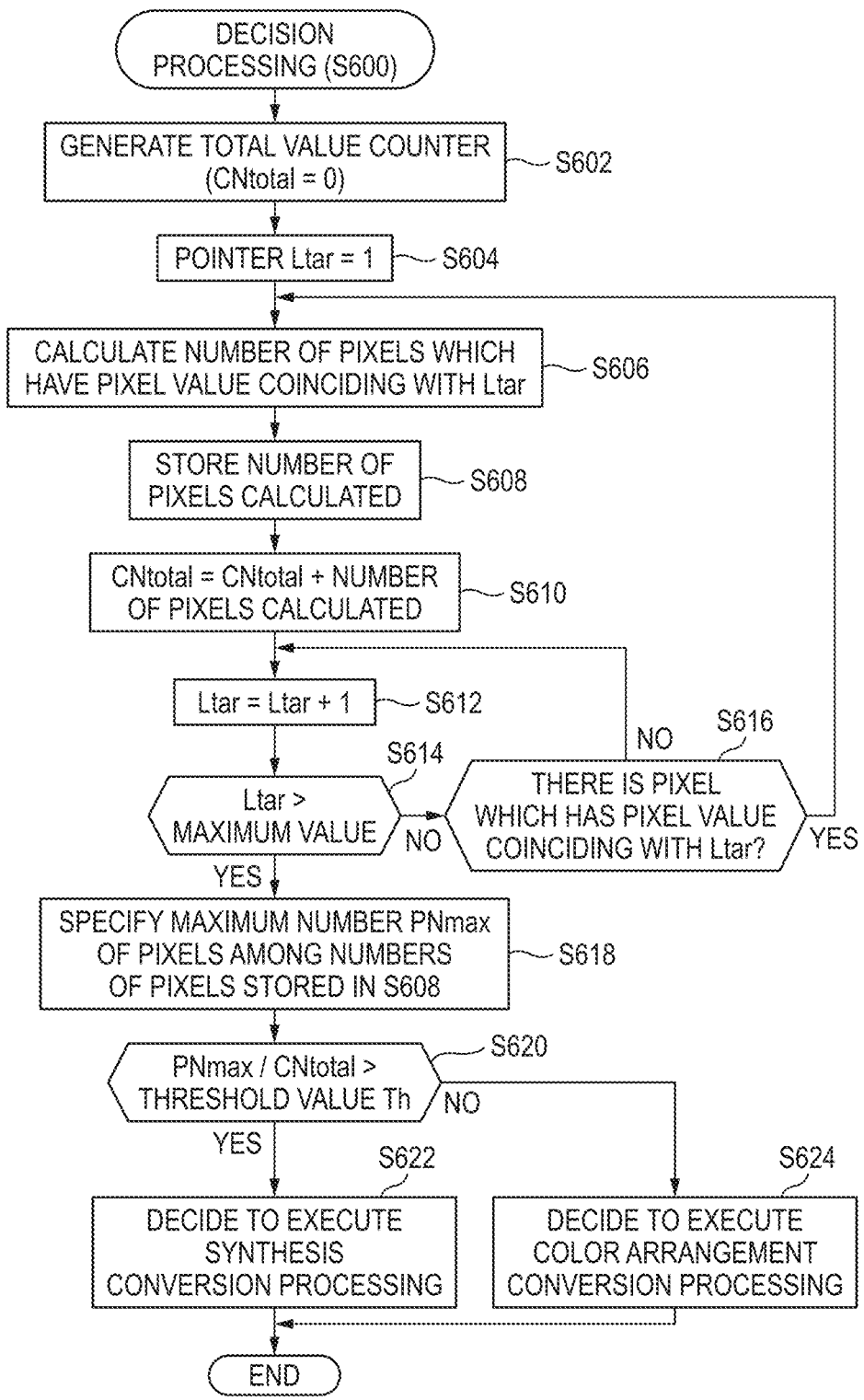
FIG. 17 is a flowchart of decision processing.

(Decision processing; FIG. 17)

Subsequently, the details of the decision processing of S600 of FIG. 16 will be described referring to FIG. 17. In S602, the CPU 62 of the image processing server 50 generates a total value counter CNtotal. The CPU 62 sets "0" as the initial value of CNtotal. Then, in S604, "1" is set as the value of the pointer Ltar.

In S606, the CPU 62 calculates the number of pixels, which have the pixel value coinciding with the value of the pointer Ltar, referring to label data LD. In S608, the CPU 62 stores the number of pixels calculated in S606. For example, in case of label data LD of FIG. 12, when "Ltar=1", the number of pixels "100" is stored in S608 of FIG. 17.

Next, in S610, the CPU 62 adds the number of pixels calculated in S606 to the current value of CNtotal. S612 to S616 are the same as S436 to S440 of FIG. 11. When it is determined to be YES in S616, the CPU 62 executes the processing after S606 again.

When it is determined to be YES in S614, in S618, the CPU 62 specifies the maximum number PNmax of pixels among the numbers of pixels stored in S608. For example, in case of label data LD of FIG. 12, the number of pixels "200" corresponding to "L=2" is specified as PNmax.

Next, in S620, the CPU 62 first divides PNmax specified in S618 by the value of CNtotal to calculate a divided value. Next, the CPU 62 performs determination about whether or not the divided value is greater than a threshold value Th determined in advance.

When it is determined that the divided value is greater than the threshold value Th (YES in S620), in S622, the CPU 62 decides to execute the synthesis conversion processing. When it is determined that the divided value is equal to or less than the threshold value Th (NO in S620), in S624, the CPU 62 decides to execute the color arrangement conversion processing. If S622 or S624 is executed, the decision processing ends.

As described above, in this example, the image processing server 50 executes the decision processing of FIG. 17 to automatically decide to execute either the synthesis conversion processing or the color arrangement conversion processing. The final count value of CNtotal is equal to the number of pixels of all object pixels in target data TD. PNmax is equal to the number of pixels of the maximum pixel group in target data TD. For this reason, the divided value calculated in S620 indicates the ratio of the maximum pixel group to all object pixels in target data TD.

Accordingly, when the ratio of the maximum pixel group to all object pixels in target data TD is comparatively large (YES in S620), the image processing server 50 decides to execute the synthesis conversion processing (S622). When the ratio of the maximum pixel group is comparatively large, if the color arrangement conversion processing is executed, for example, a comparatively large object image (that is, the character "A") shown in FIG. 6A is converted to an object image having a single color, and thus, the user may feel a converted image to be a monotonous image. In contrast, in this example, when the ratio of the maximum pixel group is comparatively large, the synthesis conversion processing is executed. For this reason, for example, the object image (that is, the character "A") shown in FIG. 6A is converted to an object image having a plurality of colors shown in FIG. 6C. For this reason, it is possible to provide the user with an interesting converted image.

When the ratio of the maximum pixel group to all object pixels in target data TD is comparatively small (NO in S620), the image processing server 50 decides to execute the color arrangement conversion processing (S624). When the ratio of the maximum pixel group is comparatively small, if the synthesis conversion processing is executed, an individual object image is small, and thus, the user does not easily recognize the pattern of the reference image in the converted image. In contrast, in this example, when the ratio of the maximum pixel group is comparatively small, the color arrangement conversion processing is executed, and thus, even if an individual object image is small, it is possible to provide the user with an interesting converted image.

(Correspondence Relationship)

The number of pixels calculated in S606 of FIG. 17 is an example of "feature data". The color arrangement conversion processing and the synthesis conversion processing are respectively examples of "first type conversion processing" and "second type conversion processing". Converted data CD2 and converted data CD1 are respectively examples of "first converted data" and "second converted data".

The processing S606 and the processing of S618 to S624 of FIG. 17 are respectively examples of processing to be executed by "calculation unit" and "decision unit". The processing of S400 and the processing of S500 of FIG. 16 are respectively examples of processing to be executed by "first selection unit" and "first conversion unit". The processing of S208 and the processing of S210 (see FIG. 5) in S200 of FIG.

16 are respectively examples of processing to be executed by "second selection unit" and "second conversion unit".

Fifth Embodiment

FIG. 18

In this embodiment, the image processing server 50 changes whether to transmit converted data CD1 to the MFP 10 or to transmit confirmation data CD1' to the MFP 10 according to an instruction received from the MFP 10.

Each kind of processing until a plurality of thumbnail images SI1 and SI2 are displayed on the display unit 14 of the MFP 10 is the same as in the first embodiment (see FIG. 2). After selecting one thumbnail image among a plurality of thumbnail images SI1 and SI2, the user can operate the operating unit 12 of the MFP 10 to select whether to print a converted image on a sheet of postcard size or to print the converted image on a sheet of A4 size to conform the content of the converted image.

When a sheet of postcard size is selected, as in FIG. 2 of the first embodiment, the CPU 32 of the MFP 10 transmits the conversion instruction 120 to the server 50. Then, if the conversion instruction 120 is received from the MFP 10, the CPU 62 of the image processing server 50 transmits converted data CD1 having the number of pixels corresponding to postcard size to the MFP 10. With this, the MFP 10 prints the converted image on the sheet of postcard size.

On the other hand, when a sheet of A4 size is selected (that is, when printing for confirmation is selected), as shown in FIG. 18, the CPU 32 of the MFP 10 transmits a confirmation instruction 122 including scan data SD1 and the reference number corresponding to the selected thumbnail image to the image processing server 50.

If the confirmation instruction 122 is received from the MFP 10, as in the first embodiment, the CPU 62 of the image processing server 50 sequentially executes the reduction processing of S10, the binarization processing of S100, and the synthesis conversion processing of S200 to generate converted data CD1.

Next, in S800, the CPU 62 of the image processing server 50 writes converted data CD1 at a predetermined position in template data stored in advance in the memory 64 to generate confirmation data CD1'. Template data has the number of pixels corresponding to A4 size, and includes data which represents a message indicative of printing confirmation. Then, the CPU 62 transmits confirmation data CD1' to the MFP 10.

If confirmation data CD1' is received from the image processing server 50, the CPU 32 of the MFP 10 supplies confirmation data CD1' to the printing execution unit 20. As a result, the printing execution unit 20 prints an image represented by confirmation data CD1' on the sheet of A4 size. With this, the user views the printed sheet, thereby confirming the content of the converted image.

FIG. 18 shows an example of a sheet P3 of A4 size on which an image represented by confirmation data CD1' is printed. A converted image is printed in the central portion of the sheet of A4 size, and a message indicative of printing confirmation is printed below the portion. In this way, in this embodiment, the converted image is not printed over the entire region of the sheet of A4 size, and the converted image is printed in a portion of the sheet of A4 size.

The technique of this embodiment can be applied to the second embodiment to the fourth embodiment, as well as the first embodiment. For embodiment, in the second embodiment, when selecting a thumbnail image (that is, "select" in FIG. 7), the user may select printing for confirmation (see "select" of FIG. 16). In this case, the CPU 62 of the image processing server 50 receives a confirmation instruction including scan data SD2 and the color arrangement number from the MFP 10. In this case, the CPU 62 generates converted data CD2 and then writes converted data CD2 at a predetermined position in template data to generate confirmation data as in the fifth embodiment. Then, the CPU 62 transmits confirmation data to the MFP 10. With this, the MFP 10 prints an image represented by confirmation data on a sheet of A4 size.

(Correspondence Relationship)

A4 size and postcard size are respectively examples of "first medium size" and "second medium size". The confirmation instruction 122 and the conversion instruction 120 are respectively examples of "first instruction" and "second instruction". Scan data SD1 and confirmation data CD1' are respectively examples of "original data" and "output data". The processing of S800 is an example of processing to be executed by "generation unit".

Although the specific embodiment of the invention has been described in detail, this is just for illustration and is not intended to limit the scope of the appended claims. The techniques described in the claims include various modifications and alterations of the above-described specific embodiment. Modification embodiments of the above-described embodiment will be described below.

Modification Embodiment 1

For example, the MFP 10 may store a plurality of pieces of synthesis data 70 or a plurality of pieces of color arrangement data 80 in advance. Then, the MFP 10 may execute each kind of processing of each embodiment (for example, T10 and S200, etc. of FIG. 2), instead of the image processing server 50. In this case, the MFP 10 can execute printing using converted data CD1 and CD2 generated by the MFP 10. In this modification embodiment, the MFP 10 is an example of "image processing apparatus".

Modification Embodiment 2

For example, a driver program for the MFP 10 may include a plurality of pieces of synthesis data 70 or a plurality of pieces of color arrangement data 80. In this case, a PC on which the driver program is installed may execute each kind of processing of each embodiment, instead of the image processing server 50. In this modification embodiment, the PC is an example of "image processing apparatus".

Modification Embodiment 3

In the above-described embodiments, scanning of the sheet P1 (see FIG. 2) of "A4 size" is executed, and printing is executed on the sheet of "postcard size". Alternatively, scanning of a sheet of different size (for example, postcard size, B4 size, B5 size, legal size, or the like) may be executed. Printing may be executed on a sheet of different size (for example, A4 size, B4 size, or the like).

Modification Embodiment 4

The image processing server 50 may execute the binarization processing of S200 for scan data SD1 having a first number of pixels corresponding to, for example, A4 size, without executing the reduction processing of S10 of FIG. 2, and may execute the synthesis conversion processing of S300 using reference data RD having the first number of pixels. In this case, converted data CD1 having the first number of pixels is generated. Then, the image processing server 50 may execute reduction processing for converted data CD1 to generate reduced data having a second umber of pixels corresponding to, for example, postcard size, and may transmit reduced data to the MFP 10. In this case, the MFP 10 can also print a converted image on the sheet of postcard size. In this modification embodiment, scan data SD1 and reduced data are respectively examples of "target data" and "first (or second) converted data".

Modification Embodiment 5

In the above-described embodiments, the image processing server 50 transmits converted data CD1 to the MFP 10 to make the MFP 10 print the converted image CI1. Alternatively, for example, the image processing server 50 may transmit converted data CD1 to a display device to make the display device display the converted image CI1. That is, "first (or second) converted data" may not be data for printing or may be data for display. That is, "output unit" may output the first (or second) converted data Modification Embodiment 6

"Target data" may not be data which is obtained from scan data or may be, for example, data which represents an image captured by a digital camera or data which represents an image drawn by drawing software. That is, "target data" may be data which represents a target image to be converted.

(Modification 7) In the above-described examples, the image processing server 50 does not convert the pixel value of each pixel (hereinafter, referred to as "non-object pixel" other than the object pixels in target data TD (for example, NO in S206 of FIG. 5 or NO in S506 of FIG. 13). In contrast, the image processing server 50 may convert the pixel value of each non-object pixel. For example, the image processing server 50 may convert the pixel value of each pixel of non-interest to the RGB value (255,255,255) indicative of white. In this case, when a sheet to be scanned is not white, the image processing server 50 may cause the MFP 10 to print a converted image representing a background image indicative of white. In general, a "first conversion unit" may select a conversion color for a object pixel and convert the pixel value of the object pixel to a value indicative of the conversion color, and may convert or may not convert the pixel value of a non-object pixel.

Modification Example 8

In the fourth example, the image processing server 50 calculates the number of pixels of each pixel group (S608 of FIG. 17), and performs determination about whether or not the divided value obtained by dividing PNmax by CNtotal is greater than the threshold value Th. In contrast, the image processing server 50 may decide to execute the synthesis conversion processing when PNmax is greater than a predetermined value, without using CNtotal, and may decide to execute the color arrangement conversion processing when PNmax is equal to or less than the predetermined value. In another modification example, the image processing server 50 may decide to execute the synthesis conversion processing when CNtotal is greater than a predetermined value, without using PNmax, and may decide to execute the color arrangement conversion processing when CNtotal is equal to or less than the predetermined value. In these modification examples, the image processing server 50 can execute appropriate processing according to target data TD, and as a result, an interesting image can be provided to the user. In general, the image processing apparatus may decide to execute either first type conversion processing or second type conversion processing using N pieces of feature data of N pixel groups.

Modification Example 9

In the above-described examples, the CPU 62 of the image processing server 50 executes the program in the memory 64, whereby each kind of processing of FIGS. 2, 3, 5, 7, 8, 11, 13, and the like is realized. Alternatively, at least one of these kinds of processing may be realized by hardware, such as a logic circuit.

The technical elements described in this specification or the drawings exhibit technical utility singly or in various combinations and are not limited to the combinations described in the appended claims as filed. The techniques illustrated in this specification or the drawings simultaneously attain a plurality of purposes, and attaining one of the purposes per se offers technical utility.

What is claimed is:

1. An image processing apparatus comprising:
a processor; and
memory that stores:
conversion color information indicative of M colors 'where M is an integer equal to or greater than 2' as conversion colors, the conversion color information being stored in the memory prior to receiving target image data representing a target image; and
computer readable instructions that, when executed by the processor, cause the image processing apparatus to execute:
acquiring the target image data representing the target image;
performing a determination for each of a plurality of target pixels forming the target image data to determine whether or not the target pixel is an object pixel which has a density equal to or higher than a predetermined density;
sorting two or more object pixels into N pixel groups including a first pixel group with first object pixels and a second pixel group with second object pixels, the first object pixels being continuous with each other, and the second object pixels being continuous with each other and being different from the first object pixels, where N is an integer equal to or greater than 2;
for each of the two or more object pixels, selecting a first color among the M colors indicated by the conversion color information as the conversion color for all object pixels belonging to the first pixel group, and selecting a second color among the M colors indicated by the conversion color information as the conversion color of all object pixels belonging to the second pixel group, the first color being different from the second color;
for each of the two or more object pixels, converting pixel values of all object pixels belonging to the corresponding pixel group to a value indicative of the conversion color for the corresponding pixel group to generate first converted data; and
outputting the first converted data.

2. The image processing apparatus according to claim 1, the selecting includes selecting N conversion colors for the N pixel groups among the M colors using a predetermined method of suppressing an increase in variation in size of M regions having the M colors included in a converted image represented by the first converted data.

3. The image processing apparatus according to claim 2, wherein:
when N is greater than M, the selecting includes selecting N conversion colors for the N pixel groups such that all of the M colors are selected as a respective conversion color for the N pixel groups,
for each of the M colors, the selecting includes counting the number of pixels for which the respective color of the M colors is selected as the conversion color, and
when the conversion color is selected for an object pixel group, among the N pixel groups, in which the conversion color is not yet selected, the selecting includes selecting a color, for which a count value of the number of pixels is not maximal, among the M colors, without selecting a color for which a count value of the number of pixels is maximal.

4. The image processing apparatus according to claim 2, wherein, when the conversion color is selected for the object pixel group, the selecting includes selecting a color for which a count value of the number of pixels is minimal, among the M colors.

5. The image processing apparatus according to claim 1, wherein:
the computer readable instructions, when executed by the processor, cause the image processing apparatus to execute:
for each of the N pixel groups, calculating feature data indicative of a feature of the pixel group; and
determining whether to execute either first type conversion processing or second type conversion processing using N pieces of feature data of the N pixel groups,
in a case where the first type conversion processing is to be executed, for each of the N pixel groups, the selecting includes selecting one color among the M colors as a conversion color for all object pixels belonging to the pixel group,
in a case where the first type conversion processing is to be executed, for each of the N pixel groups, the converting includes converting the pixel values of all object pixels belonging to the pixel group to a value indicative of the conversion color for the pixel group to generate the first converted data,
the computer readable instructions, when executed by the processor, cause the image processing apparatus to execute:
acquiring specific data representing a specific image having a plurality of colors in a case where the second type conversion processing is to be executed;
for each of the two or more object pixels, extracting a corresponding pixel at a position in the specific data corresponding to a position of the object pixel in the target image data and selecting a color indicated by a pixel value of the corresponding pixel as a conversion color for the object pixel in a case where the second type conversion processing is to be executed; and
for each of the two or more object pixels, converting the pixel value of the object pixel to a value coinciding with the pixel value of the corresponding pixel extracted for the object pixel to generate second converted data in a case where the second type conversion processing is to be executed, and
the outputting includes outputting the first converted data in a case where the first type conversion processing is to be executed, and outputting the second converted data in a case where the second type conversion processing is to be executed.

6. The image processing apparatus according to claim 1, wherein:
the target image data representing the target image is acquired by reducing original data corresponding to a first medium size to acquire the target image data corresponding to a second medium size smaller than the first medium size, and
the computer readable instructions, when executed by the processor, cause the image processing apparatus to execute:
when a first instruction is given, writing the first converted data into template data having the first medium size and generating output data;
when the first instruction is given, outputting the output data to cause a printing execution unit to execute printing on a printing medium corresponding to the first medium size; and
when a second instruction different from the first instruction is given, outputting the first converted data to the printing execution unit to cause the printing execution unit to execute printing on a printing medium corresponding to the second medium size.

7. The image processing apparatus according to claim 1, wherein the target image represented by the target image data is generated by scanning an image that is handwritten by a user on a document.

8. An image processing apparatus comprising:
a processor; and
memory that stores:
conversion color information indicative of M colors 'where M is an integer equal to or greater than 2' as conversion colors, the conversion color information being stored in the memory prior to receiving a target image data representing a target image; and
computer readable instructions that, when executed by the processor, cause the image processing apparatus to execute:
acquiring the target image data representing the target image including a continuous pixel area in which a plurality of object pixels which has a density equal to or higher than a predetermined density are continuous with each other;
acquiring specific data representing a specific image having a plurality of colors, the specific image including a color arrangement area in which a plurality of colors are arranged according to a predetermined arrangement pattern which are determined in advance;
performing a determination for each of a plurality of target pixels forming the target image data to determine whether or not the target pixel is the object pixel;
for each of two or more object pixels, extracting a corresponding pixel at a position in the specific data corresponding to the position of the object pixel in the target image data and selecting a color indicated by a pixel value of the corresponding pixel as a conversion color for the object pixel;
for each of the two or more object pixels, generating first converted data indicative of a conversion image in which an area inside the conversion image corresponding to the continuous pixel area in the target image has a pattern that is the same as the predetermined arrangement pattern of the color arrangement area; and outputting the first converted data.

9. The image processing apparatus according to claim 8, wherein:

the selecting includes extracting a first corresponding pixel at a position in the specific data corresponding to the position of a first object pixel in the target image data and selecting a first color indicated by a pixel value of a first corresponding pixel as the conversion color for the first object pixel, and the selecting includes extracting a second corresponding pixel at a position in the specific data corresponding to a position of a second object pixel in the target image data and selecting a second color indicated by a pixel value of a second corresponding pixel as the conversion color for the second object pixel.

10. The image processing apparatus according to claim 8, wherein:

the target image data representing the target image is acquired by reducing original data corresponding to a first medium size to acquire the target image data corresponding to a second medium size smaller than the first medium size, and the computer readable instructions, when executed by the processor, cause the image processing apparatus to execute:

when a first instruction is given, writing the first converted data into template data having the first medium size and generating output data;

when the first instruction is given, outputting the output data to cause a printing execution unit to execute printing on a printing medium corresponding to the first medium size; and when a second instruction different from the first instruction is given, outputting the first converted data to the printing execution unit to cause the printing execution unit to execute printing on a printing medium corresponding to the second medium size.

11. The image processing apparatus according to claim 8, wherein the target image represented by the target image data is generated by scanning an image that is handwritten by a user on a document.

12. A non-transitory computer readable recording medium storing a program that, when executed by a computer of an image processing apparatus, causes the image processing apparatus, which includes memory storing conversion color information indicative of M colors 'where M is an integer equal to or greater than 2' as conversion colors, the conversion color information being stored in the memory prior to receiving a target image data representing a target image, to execute:

acquiring the target image data representing the target image to be converted;

performing a determination for each of a plurality of target pixels forming the target image data to determine whether or not the target pixel is an object pixel which has a density equal to or higher than a predetermined density;

sorting two or more object pixels into N pixel groups including a first pixel group with first object pixels and a second pixel group with second object pixels, the first object pixels being continuous with each other, and the second object pixels being continuous with each other and being different from the first object pixels, where N is an integer equal to or greater than 2;

for each of the two or more object pixels, selecting a first color among the M colors indicated by the conversion color information as the conversion color for all object pixels belonging to the first pixels group, and selecting a second color among the M colors indicated by the conversion color information as the conversion color of all object pixels belonging to the second pixel group, the first color being different from the second color;

for each of the two or more object pixels, converting pixel values of all object pixels belonging to the corresponding pixel group to a value indicative of the conversion color for the corresponding pixel group to generate first converted data; and outputting the first converted data.

13. The non-transitory computer readable recording medium according to claim 12, wherein the program, when executed by the computer, causes the image processing apparatus to acquire specific data representing a specific image having a plurality of colors, wherein, for each of the two or more object pixels, the selecting includes extracting a corresponding pixel at a position in the specific data corresponding to a position of the object pixel in the target image data and selecting a color indicated by a pixel value of the corresponding pixel as the conversion color for the object pixel, and wherein, for each of the two or more object pixels, the converting includes converting the pixel value of the object pixel to a value coinciding with the pixel value of the corresponding pixel extracted for the object pixel to generate the first converted data.

14. The non-transitory computer readable recording medium according to claim 13, wherein:

the selecting includes extracting a first corresponding pixel at a position in the specific data corresponding to a position of a first object pixel in the target image data and selecting a first color indicated by a pixel value of the first corresponding pixel as the conversion color for the first object pixel, and the selecting includes extracting a second corresponding pixel at a position in the specific data corresponding to a position of a second object pixel in the target image data and selecting a second color indicated by a pixel value of the second corresponding pixel as the conversion color for the second object pixel.

15. A non-transitory computer readable recording medium storing a program that, when executed by a computer of an image processing apparatus, causes the image processing apparatus, which includes memory storing conversion color information indicative of M colors 'where M is an integer equal to or greater than 2' as conversion colors, the conversion color information being stored in the memory prior to receiving a target image data representing a target image, to execute:

acquiring the target image data representing the target image including a continuous pixel area in which a plurality of object pixels which has a density equal to or higher than a predetermined density are continuous with each other;

acquiring specific data representing a specific image having a plurality of colors, the specific image including a color arrangement area in which a plurality of colors are arranged according to a predetermined arrangement pattern which is determined in advance;

performing determination for each of a plurality of target pixels forming the target image data about whether or not the target pixel is the object pixel;

for each of two or more object pixels, extracting a corresponding pixel at a position in the specific data corresponding to the position of the object pixel in the target image data and selecting a color indicated by a pixel value of the corresponding pixel as a conversion color for the object pixel; and for each of the two or more object pixels, generating first converted data indicative of a conversion image in which an area inside the conversion image corresponding to the continuous pixel area in the target image has a pattern that is the same as the predetermined arrangement pattern of the color arrangement area; and outputting the first converted data.

\* \* \* \* \*